United States Patent [19]
Kaneko et al.

[11] Patent Number: 5,404,246
[45] Date of Patent: Apr. 4, 1995

[54] PROJECTION LENS SYSTEM

[75] Inventors: Toshihide Kaneko; Eiichi Toide; Naoki Kawamoto, all of Nagaokakyo, Japan

[73] Assignee: Mitsubishi Denki Kabushiki Kaisha, Tokyo, Japan

[21] Appl. No.: 80,702

[22] Filed: Jun. 24, 1993

[30] Foreign Application Priority Data

Jun. 26, 1992 [JP] Japan .................... 4-169369
Jan. 7, 1993 [JP] Japan .................... 5-018051

[51] Int. Cl.$^6$ ................................ G02B 13/18
[52] U.S. Cl. ...................... 359/649; 359/708; 359/713
[58] Field of Search ............. 359/649–651, 359/708, 713

[56] References Cited

U.S. PATENT DOCUMENTS

| | | | |
|---|---|---|---|
| 4,300,817 | 11/1981 | Betensky | 359/651 |
| 4,776,681 | 10/1988 | Moskovich | 359/650 |
| 5,130,850 | 7/1992 | Toide | 359/649 |
| 5,148,320 | 9/1992 | Toide | 359/649 |

Primary Examiner—Scott J. Sugarman

[57] ABSTRACT

A projection lens system has a first lens to a sixth lens which are serially arranged in this order from a screen side. The first lens has a meniscus configuration in which a convex surface is directed toward the screen side and the power of the lens changes from positive to negative from the optical axis toward a peripheral portion of the lens. The first lens has two aspherical surfaces. The second lens has a positive power meniscus configuration in which a convex surface is directed toward the screen side. Both surfaces of the second lens are aspherical. The third lens has a positive power meniscus configuration in which a convex surface is directed toward the screen side. The fourth lens is disposed close to the third lens and has two convex surfaces. The fifth lens has a positive power meniscus configuration in which a concave surface is directed toward the screen side. Both surfaces of the fifth lens are aspherical. The sixth lens has a concave surface which has a large curvature directed toward the screen side. The surface of the sixth lens on the screen side is aspherical.

9 Claims, 24 Drawing Sheets

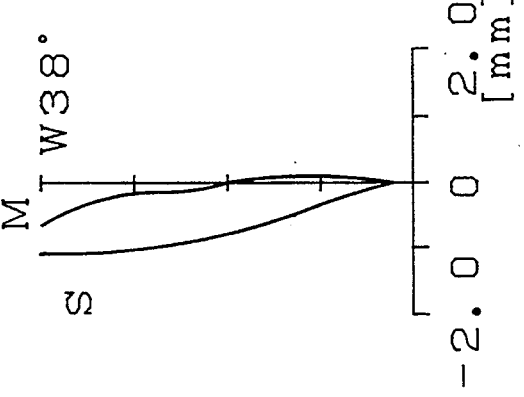
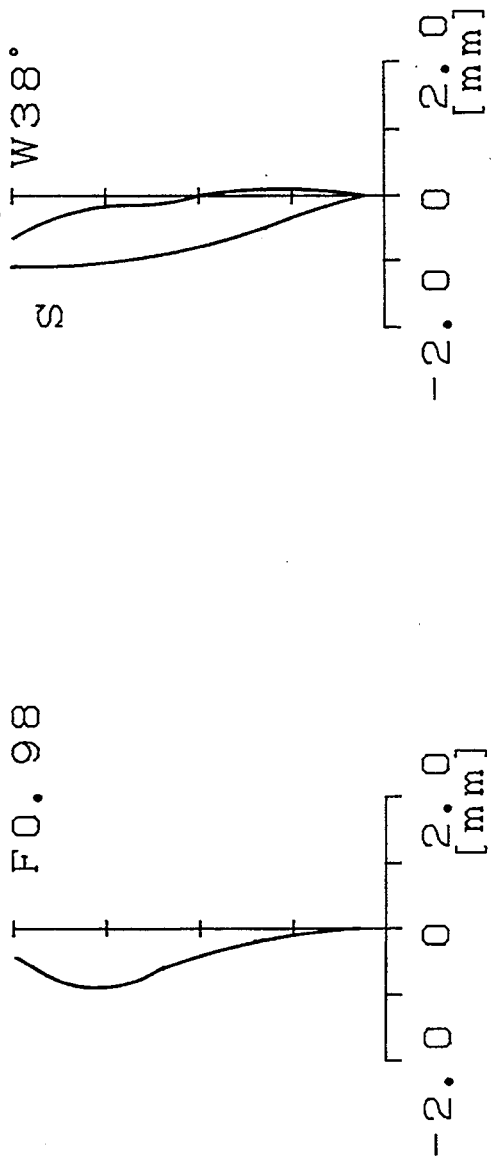

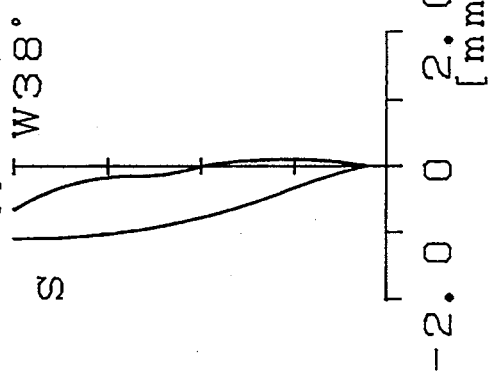
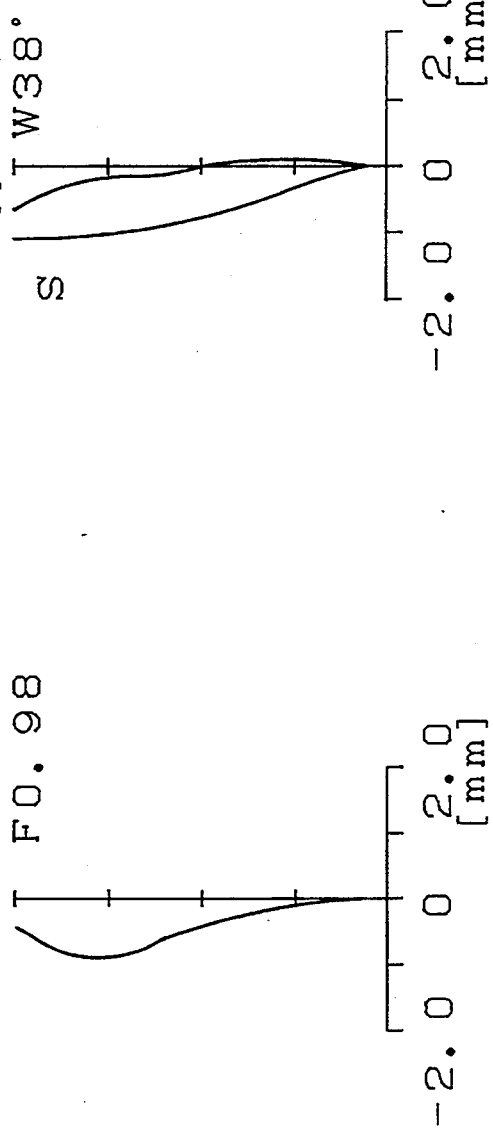

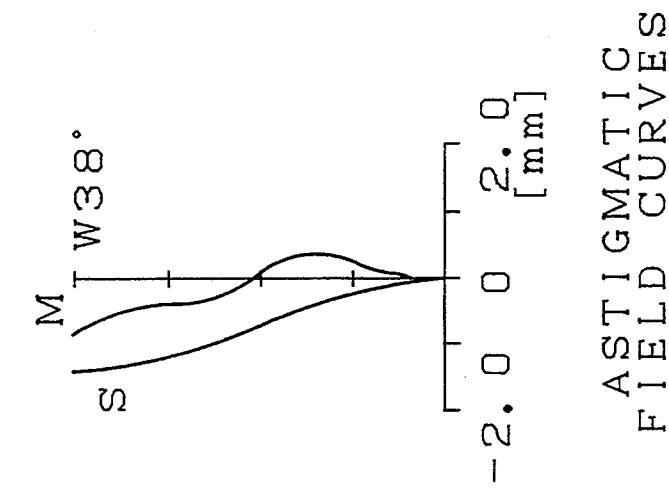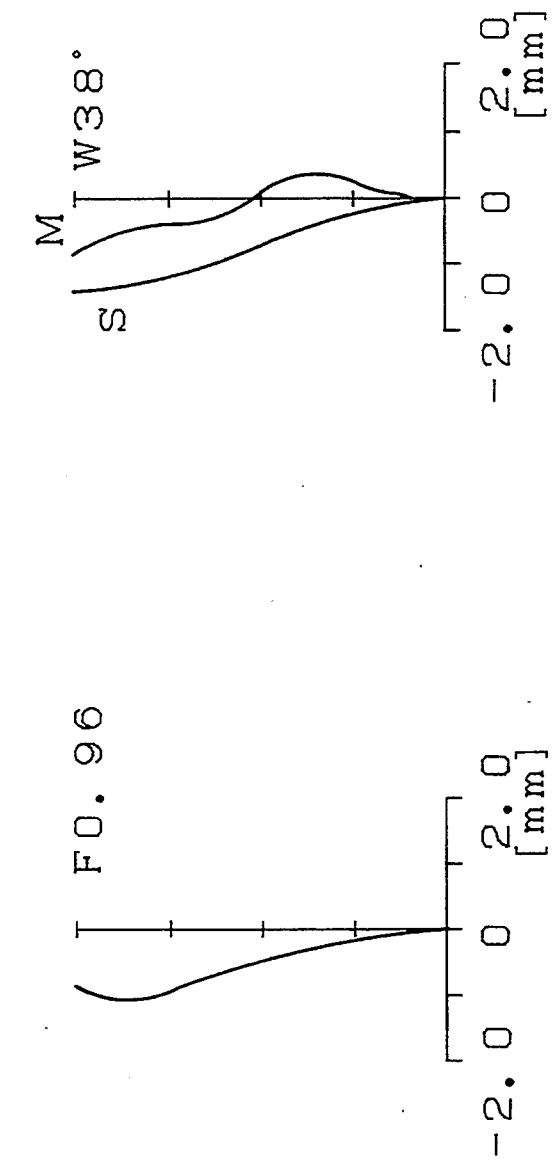

LONGITUDINAL SPHERICAL ABER.

ASTIGMATIC FIELD CURVES

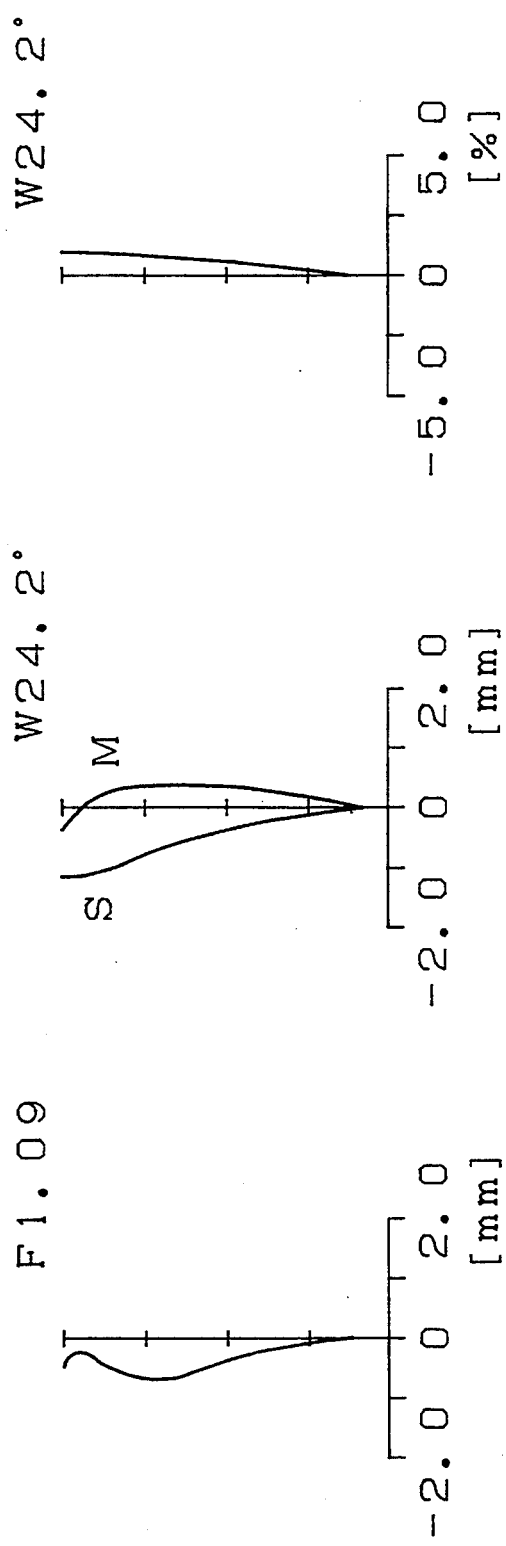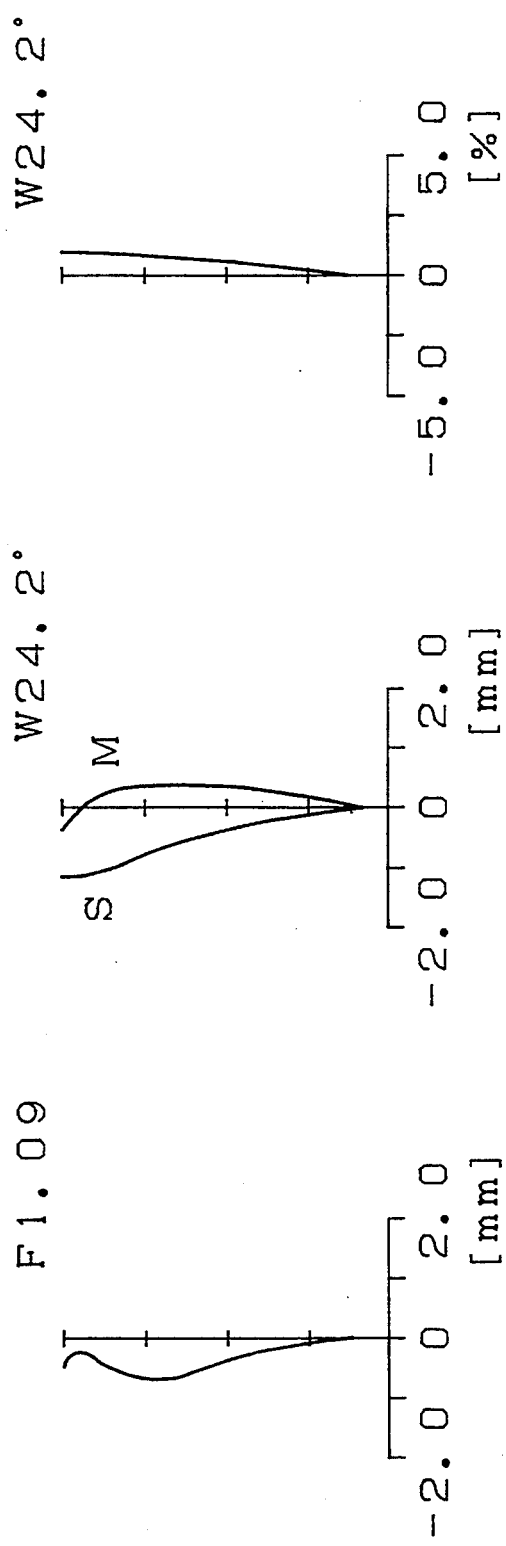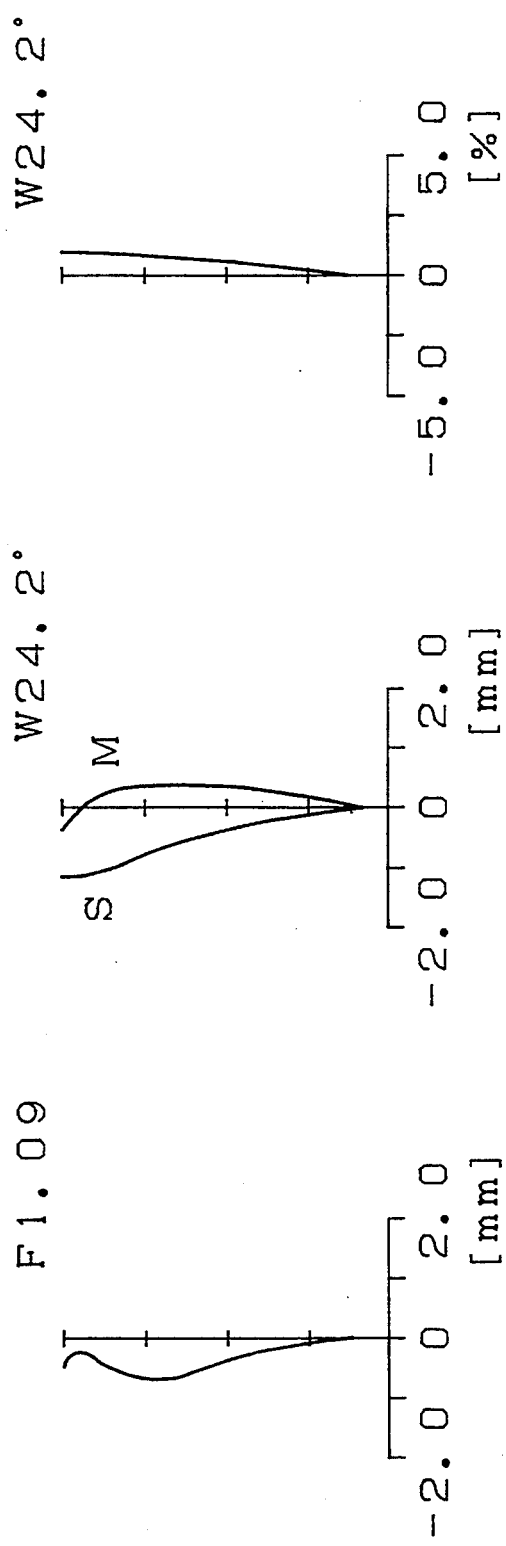

LONGITUDINAL SPHERICAL ABER.

ASTIGMATIC FIELD CURVES

DISTORTION

PROJECTION LENS SYSTEM

BACKGROUND OF THE INVENTION

1. Field of the invention

The present invention is related to a projection lens system for use within a projection-type display suitable for obtaining a high-quality projected image. Particularly, it relates to a projection lens system which has a wide total field angle and a large relative aperture.

2. Description of Related Art

In recent years there has been a seen strong demand for a larger picture image on a larger screen. To satisfy the demand, a projection television is becoming popular as a method of obtaining a television image on a large screen. In a projection television, an image which is formed on a CRT for a red, a blue and a green colors, which serves as an image source, is magnified and projected by a projection lens system in order to synthesize a large size image in full color on a screen. In such an optical system, the performances of the projection lens system are important to obtain an image of high quality.

A projection lens system for use within a projection television set needs to have a relative aperture of as large as almost 1 in order to form a sufficiently bright image on a screen. At the same time, the projection lens system must ensure that aberrations are excellently corrected even at a peripheral portion of the screen. In addition, since a projection television set, being larger in depth than a direct-view television set, requires large space, demand has been mounting for a projection lens system which has a short projection distance and a large total field angle so that the size of the television set can be reduced.

The performances of a projection lens system are a decisive factor in creating a high-quality image with a video projector. The projection lens system must have: a large relative aperture to ensure brightness on a screen; a wide total field angle to attain a shortened projection distance; a reduced size and a light weight to reduce the size of the set; and an excellent focusing performance all over the screen from a center to a peripheral portion of the screen to achieve an enhanced resolution.

As a lens system which satisfies these requirements, a lens system which is constructed of glass lenses has been in wide use. However, a glass lens increases in weight when increased in the aperture. Another drawback regarding a glass lens system is that an increased number of lenses will be necessary if various aberrations are to be corrected. For these reasons, an approach employing an aspherical lens has now been widely adopted as an aberration correcting method which requires less lenses.

There are a number of examples where an aspherical plastic lens is used in order to realize a projection lens system which has a larger total field angle or a large aperture ratio. However, an aperture ratio of 1 or less can not be easily attained when a large total field angle and an excellent imaging performance all over the screen are to be achieved, and in a very likely case in which an aperture ratio of i or less is impossible, an image will not be sufficiently bright. Further, to attain excellent correction of aberrations with respect to a light flux impinging on the entire screen, the aspherical lens must have a large aspheric sag, thereby making it difficult to finish the aspherical lens with enough accuracy. Hence, full use of the design performance of the aspherical lens cannot be made, especially at the peripheral portion of the screen.

Conversely, if the aperture ratio is increased, the diameter of the light flux increases accordingly. As a result, a possibility of causing aberrations is increased especially when an aspherical plastic lens, which cannot be finished accurately in an easy manner, is disposed in the vicinity of a screen. This leads to flare-induced deterioration in the contrast of an image. In addition, it is difficult to ensure a large enough total field angle for excellent correction of aberrations at the light flux of a large diameter, which stands as an obstacle in reducing the size of the projection television set.

Further, during operation of the projection television in which the projection lens system is mounted, the temperatures of lenses become different within the projection lens system because of heat generation in the image source, i.e., the CRT. Hence, there arises a problem that the performances of the projection lens system expected during the process of designing are different from the performances observed in actual operations. This is a serious problem especially with a plastic lens since a plastic lens is susceptible to heat. One problem regarding a plastic lens due to heat generation is a change in the refractive index of the plastic lens.

With the current level of technology, a large-aperture aspherical lens made of glass is very difficult to manufacture. For this reason, an aspherical lens which is made of a plastic material is used instead. Use of a plastic aspherical lens having a large aperture in a projection lens system, however, is not advantageous since it is very difficult to form the aspherical lens. Further, the image formation performance of the aspherical lens easily deteriorates because of a change in the refractive index of the plastic material due to a change in the temperature or because of deformation of the aspherical lens due to a change in the humidity.

Further, when a large projection tube over 10 inches is used as a source of projection light to ensure brightness on the projection screen, since the lenses used to be adaptive to the large projection tube have large diameters and a converging lens having a positive converging power is thick at the center of the lens, chances are that the lenses, each increased in weight, cannot be easily assembled. If the aperture of a lens is larger than 200 mm, an excessively large thickness of the lens at the center of the lens results in difficulty in obtaining the glass material and an increase in the manufacturing cost.

SUMMARY OF THE INVENTION

It is an object of the present invention to provide a projection lens system which has a relative aperture of 1 or less and a half field angle of 38 degrees or more and hence which exhibits an excellent image formation performance.

It is another object of the present invention to provide a compact-size projection television which controls a difference in the performances of a projection lens system between a designing stage and actual operation of the projection lens system due to a temperature distribution and hence which creates a bright image even when a small CRT is employed therein.

It is still another object of the present invention to provide a projection lens system which achieves high resolution despite a large aperture and a large total field angle, and which, though using a plastic lens, causes less deterioration in image formation performance even when there is an environmental change.

It is further another object of the present invention to provide a projection lens system which is easily manufactured even when the aperture is as large as 200 mm or more.

A projection lens system according to the first embodiment includes, from a screen side: a first lens of a meniscus configuration, the first lens having a convex surface directed toward the screen side, the power of the first lens being positive near the optical axis and changing to negative with a distance from the optical axis toward a peripheral portion of the lens, the first lens having two aspherical surfaces; a second lens of a positive power meniscus configuration, the second lens having a convex surface directed toward the screen side and having two aspherical surfaces; a third lens of a positive power meniscus configuration, the third lens having a convex surface directed toward the screen side; a fourth lens disposed close to the third lens and having two convex surfaces; a fifth lens of a positive power meniscus configuration, the fifth lens having a concave surface directed toward the screen side and having two aspherical surfaces; and a sixth lens having a concave surface which has a large curvature directed toward the screen side, a surface of the sixth lens on the screen side including an aspherical surface.

In the projection lens system according to the first embodiment, accurate correction of spherical aberration and coma and conversion of light with a weak positive power are attained by the first lens and the second lens. The third lens and the fourth lens which is disposed in the vicinity of the third lens have a strong light conversion function which accounts for most of the light conversion function of the total lens system. The fifth lens accurately corrects astigmatism, distortion and coma. The sixth lens, having a configuration in which the concave surface is directed toward the screen side, functions to accurately form an image on a fluorescent screen of a CRT.

To achieve a wide total field angle and a large aperture ratio in the projection lens system, the first lens, the second lens, the fifth lens and the sixth lens are each finished in an aspherical configuration, whereby accurate correction of aberrations, an excellent image formation performance and a reduction in the number of lenses and the cost are attained. In addition, by using plastic as a lens material for aspherical lenses, the projection lens system is reduced in weight.

In order to achieve a wide total field angle and a large aperture ratio in the construction as described above, the projection lens system preferably satisfies the following conditions:

$$0.0 \leq f/f12 \leq 0.2 \tag{1}$$

$$0.9 \leq D8/f \leq 1.0 \tag{2}$$

$$0.2 < f4/f3 < 0.8 \tag{3}$$

where
f : the focal length of the total lens system
f12 : the composite focal length of the first lens and the second lens
D8 : a distance from an apex on an image side surface of the fourth lens to an image plane
f3 : the focal length of the third lens
f4 : the focal length of the fourth lens The condition (1) above relates to a composite power of the first lens and the second lens. If the ratio concerning the composite power is below the lower limit of the condition, the diameter of the light flux will increase, and especially, the aspheric sag of the second lens will increase for correction of spherical aberration. In this case, a manufacturing tolerance will become impractical. On the other hand, if the ratio concerning the composite power exceeds the upper limit of the condition, correction of aberrations, particularly, correction of off-axis coma aberrations will become difficult. The condition (2) above relates to the arrangement of the third lens and the fourth lens which have a strong light conversion function to perform most of the light conversion function of the total lens system. If the ratio concerning the arrangement is below the lower limit of the condition (2), it will become difficult to attain a wide angle and create enough brightness. If the ratio concerning the arrangement exceeds the upper limit of the condition (2), on the other hand, correction of off-axis aberrations will become difficult. The condition (3) above relates to a distribution of power between the third lens and the fourth lens which have a strong light conversion function to perform most of the light conversion functions of the total lens system. If the ratio concerning the power distribution is below the lower limit of the condition (3), an amount of light at a peripheral portion drops below a practical level. If the ratio concerning the power distribution exceeds the upper limit of the condition (3), spherical aberration will be increased. In this case, the aspheric sags of the aspherical lenses included in the forward lenses must be increased to correct the increased spherical aberration. Hence, a greater possibility is created that the aspherical lenses will be manufactured less accurately and consequently will have deteriorated performances.

In the construction described above, to deal with a change in the refractive index due to a change in temperature, the projection lens system according to the first invention preferably satisfies the following condition:

$$n1 \geq n2 \geq n5 \geq n6 \tag{4}$$

where
n1 : the refractive index of the first lens
n2 : the refractive index of the second lens
n5 : the refractive index of the fifth lens
n6 : the refractive index of the sixth lens The condition (4) above relates to the refractive indexes of the aspherical lenses which are made of plastic. A distribution in temperature among the lenses during operation is found and the temperature-dependence of the refractive index of an acrylic material is taken into consideration to control a difference between the performances of the projection lens system in the designing stage and in the actual operation of the projection lens system.

A projection lens system according to the second embodiment includes from a screen side: a first lens of a positive power meniscus configuration, the first lens having a convex surface directed toward the screen side; a second lens of a positive power meniscus configuration, the second lens having a convex surface directed toward the screen side and having two aspherical surfaces; a negative third lens; a positive Fourth lens; a positive fifth lens; a negative sixth lens; a positive seventh lens; an eighth lens of a meniscus configuration, the eighth lens having a concave surface directed toward the screen side and having two aspherical surfaces; and a negative ninth lens. The projection lens system according to the second embodiment satisfies the following conditions:

$$-2.0 < f6/f45 < -1.7 \tag{5}$$

$$1.7 < f7/f45 < 1.9 \tag{6}$$

where f45 : the composite focal length of the fourth lens and the fifth lens f6 : the focal length of the sixth lens f7 : the focal length of the seventh lens In the projection lens system according to the second embodiment, the first lens and the second lens have a function of correcting spherical aberration and coma and converging light with a positive power. The third lens has a function of diverging light. The fourth lens and the fifth lens have a function of converging light with a positive power. The sixth lens has a function of diverging light. In addition, the sixth lens also corrects chromatic aberration together with the seventh lens. In addition to the function of correcting chromatic aberration, the seventh lens has a function of converging light. The eighth lens has a function of correcting astigmatism, distortion and coma. The ninth lens corrects a curvature of field so that an image is correctly formed on a fluorescent screen of a CRT.

The conditions (5) and (6) relate to an arrangement of power lenses which perform most of light convergence within the total lens system. Correction of coma will become difficult if the ratio exceeds the upper limit of the condition (5), while correction of chromatic aberration and astigmatism will become difficult if the ratio is below the lower limit of the condition (5). Correction of coma will become difficult if the ratio exceeds the upper limit of the condition (6), while correction of spherical aberration will become difficult if the ratio is below the lower limit of the condition (6). Further, since correction of chromatic aberration is attained without employing a joined lens, the projection lens system is manufactured at a reduced cost.

In the construction described above, the projection lens system according to the second embodiment preferably satisfies the following conditions:

$$t1 < 7000/D1 \tag{7}$$

$$t7 < 7000/D7 \tag{8}$$

$$t9 < 7000/D9 \tag{9}$$

$$t13 < 7000/D13 \tag{10}$$

where t1 : the thickness of the first lens taken at the center of the first lens t7 : the thickness of the fourth lens taken at the center of the fourth lens t9 : the thickness of the fifth lens taken at the center of the fifth lens t13 : the thickness of the seventh lens taken at the center of the seventh lens D1 : t, he diameter of the first; lens D7 : the diameter of the fourth lens D9 : the diameter of the fifth lens D13 : the diameter of the seventh lens The conditions (7), (8), (9) and (10) above relate to the relations between the diameters and the thicknesses taken at the center of the first lens, the fourth lens, the fifth lens and the seventh lens, respectively. In accordance with these conditions, the thickness of each lens is restricted when the diameter of the lens is increased. Hence, even when the lenses have a diameter exceeding 200 mm, the weight of each lens is limited to such a weight with which assembly of the lenses remains possible.

A projection lens system according to the third embodiment includes, frown a screen side: a first lens of a positive power meniscus configuration, the first lens having convex surface directed toward the screen side; a second lens of a positive power meniscus configuration, the second lens having a convex surface toward the screen side and having two aspherical surfaces; a negative third lens; a positive fourth lens; a negative fifth lens; a positive sixth lens; a positive seventh lens; an eighth lens of a meniscus configuration, the eighth lens having a concave surface directed toward the screen side and having two aspherical surfaces; and a negative ninth lens. The projection lens system according to the third embodiment satisfies the following conditions:

$$-2.1/f5/f4 < -1.4 \tag{11}$$

$$0.7 < /f67/f4 < 0.9 \tag{12}$$

where f4 : the focal length of the fourth lens f5 : the focal length of the fifth lens f67 : the composite focal length of the sixth lens and the seventh lens In the projection lens system according to the third embodiment, the first lens and the second lens have a function of correcting spherical aberration and coma and converging light with a positive power. The third lens has a function of diverging light. The fourth lens converges light with a positive power. The fifth lens has a function of diverging light. The fifth lens also corrects chromatic aberration together with the fourth lens and the sixth lens. In addition to the function of correcting chromatic aberration, the sixth lens has a function of converging light. The seventh lens converges light with a positive power. The eighth lens has a function of correcting astigmatism, distortion and coma. The ninth lens corrects a curvature of field so that an image is correctly formed on a fluorescent screen of a CRT.

The conditions (11) and (12) above relate to an arrangement of power lenses which perform most of light convergence in the total lens system. Correction of coma will become difficult if the ratio exceeds the upper limit of the condition (11), while correction of chromatic aberration and astigmatism will become difficult if the ratio is below the lower limit of the condition (11). Correction of coma will become difficult if the ratio exceeds the upper limit of the condition (12), while correction of spherical aberration will become difficult if the ratio is below the lower limit of the condition (12). Further, since correction of chromatic aberration is attained without employing a joined lens, the projection lens system is manufactured at a reduced cost.

In addition, in the construction as described above, the projection lens system according to the third invention preferably satisfies the following conditions:

$$t1 < 7000/D1 \tag{13}$$

$$t7 < 7000/D7 \tag{14}$$

$$t11 < 7000/D11 \quad (15)$$

$$t13 < 7000/D13 \quad (16)$$

where
- t1 : the thickness of the first lens taken at the center of the first lens
- t7 : the thickness of the fourth lens taken at the center of the fourth lens
- t11 : the thickness of the sixth lens taken at the center of the sixth lens
- t13 : the thickness of the seventh lens taken at the center of the seventh lens
- D1 : the diameter of the first lens
- D7 : the diameter of the fourth lens
- D11 : the diameter of the sixth lens
- D13 : the diameter of the seventh lens The conditions (13), (14), (15) and (16) above relate to the relations between the diameters and the thicknesses taken at the center of the first lens, The fourth lens, the seventh lens and the sixth lens, respectively. In accordance with these conditions, the thickness of each lens is restricted when the diameter of the lens is increased. Hence, even when the lenses have a diameter exceeding 200 mm, the weight of each lens is limited to such a weight with which assembly of the lenses remains possible.

A projection lens system according to the fourth embodiment includes from a screen side: a first lens of a positive power meniscus configuration, the first lens having a convex surface directed toward the screen side; a second lens of a positive power meniscus configuration, the second lens having a convex surface directed toward the screen side and having two aspherical surfaces; a negative third lens; a fourth lens having two convex surfaces and having a positive refractive power; a negative fifth lens joined to the fourth lens; a positive sixth lens; a seventh lens of meniscus configuration, the seventh lens having a concave surface directed toward the screen side and having two aspherical surfaces; and a negative eighth lens. The projection lens system according to the fourth embodiment satisfies the following conditions:

$$0.6 < f/f1 < 0.7 \quad (17)$$

$$-1.1 < f/f3 < -0.9 \quad (18)$$

$$0.1 < t4/f < 0.2 \quad (19)$$

$$1.2 < t6/t4 < 1.4 \quad (20)$$

where
- f : the focal length of the total lens system
- f1 : the focal length of the first lens
- f3 : the focal length of the third lens
- L4 : an interval between the second lens and the third lens taken on the optical axis
- t6 : an interval between the third lens and the fourth lens taken on the optical axis In the projection lens system according to the fourth invention, the first lens and the second lens correct spherical aberration and coma and converge light with a positive power. The third lens has a function of diverging light. The fourth lens has a function of converging light. The fifth lens which is joined to the fourth lens has a function of diverging light, and together with the fourth lens, corrects chromatic aberration. The sixth lens converges light with a positive power. The seventh lens corrects astigmatism, distortion and coma. The eighth lens corrects a curvature of field so that an image is correctly formed on a fluorescent screen of a CRT.

The condition (17) above relates to the power of the first lens. If the ratio regarding the power exceeds the upper limit of the condition, correction of coma will become difficult. On the other hand, if the ratio regarding the power is below the lower limit of the condition, the overall length of the total lens system will be increased. The condition (18) above relates to the power of the third lens. Correction of chromatic aberration and sagittal flare will become difficult if the ratio regarding the power exceeds the upper limit of the condition (18), while coma will be caused easily if the ratio regarding the power is below the lower limit of the condition (18). The condition (19) above relates to an interval between the second lens and the third lens taken on the optical axis. Correction of coma will become difficult if the ratio regarding the interval exceeds the upper limit of the condition (19), whereas correction of spherical aberration will become difficult if the ratio regarding the interval is below the lower limit of the condition (19). The condition (20) above relates to an interval between the third lens and the fourth lens taken on the optical axis. If the ratio regarding the interval exceeds the upper limit of the condition (20), magnification chromatic aberration will be caused. On the other hand, if the interval regarding the power is below the lower limit of the condition (20), sagittal flare will become large.

A projection lens system according to the fifth embodiment includes, from a screen side: a first lens of a positive power meniscus configuration, the first lens having a convex surface directed toward the screen side; a second lens of a positive power meniscus configuration, the second lens having a convex surface directed toward the screen side and having two aspherical surfaces; a negative third lens; a fourth lens having two convex surfaces and having a positive refractive power; a negative fifth lens disposed close to the fourth lens; a positive sixth lens; a seventh lens of meniscus configuration, the seventh lens having a concave surface directed toward the screen side and having two aspherical surfaces; and a negative eighth lens. The projection lens system according to the fifth embodiment satisfies the following conditions:

$$0.5 < f/f1 < 0.7 \quad (21)$$

$$-1.1 < f/f3 < -1.0 \quad (22)$$

$$0.1 < t6/t4 < 1.3 \quad (24)$$

$$1.1 < t6/t4 < 1.3 \quad (24)$$

where
- f : the focal length of the total lens system
- f1 : the focal length of the :First lens
- f3 : the focal length of the third lens
- t4 : an interval between the second lens and the third lens taken on the optical axis
- t6 : an interval between the third lens and the fourth lens taken on the optical axis In the projection lens system according to the fifth embodiment, the first lens and the second lens correct spherical aberration and coma and converge light with a positive power. The third lens has a function of diverging light. The fourth lens has a function of converging light. The fifth lens which is disposed in the vicinity of the fourth lens has a function of diverging light, and together with the fourth lens, corrects chromatic aberration. The sixth lens converges light with a positive power. The seventh lens corrects astigmatism, distortion and coma. The eighth lens corrects a curvature of field so that an image is correctly formed on a fluorescent screen of a CRT.

The condition (21) above relates to the power of the first lens. Correction of coma will become difficult if the ratio regarding the power exceeds tile upper limit of the condition (21), while the overall length of the total lens system will be increased if the ratio regarding the power is below the lower limit of the condition (21). The condition (22) above relates to the power of the third lens. If the ratio regarding the power exceeds the upper limit of the condition (22), correction of chromatic aberration and sagittal flare will become difficult. On the other hand, if the ratio regarding the power is below the lower limit of the condition (22), coma will be caused easily. The condition (23) above relates to an interval between the second lens and the third lens taken on the optical axis. Correction of coma will become difficult if the interval regarding the power exceeds the upper limit of the condition (23), while correction of spherical aberration will become difficult if the ratio regarding the interval is below the lower limit of the condition (23). The condition (24) above relates to the interval between the second lens and the third lens taken on the optical axis and an interval between the third lens and the fourth lens taken on the optical axis. If the ratio regarding the intervals exceeds the upper limit of the condition (24), magnification chromatic aberration will be caused. On the other hand, if the ratio regarding the intervals is below the lower limit of the condition (24), sagittal flare will become large. Further, since correction of chromatic aberration is attained without employing a joined lens, the projection lens system is manufactured at a reduced cost.

The above and further objects and features of the invention will more fully be apparent from the following detailed description with accompanying drawings.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a diagram showing aberrations of the projection lens system according to the first example of the first embodiment;

FIG. 4 is a diagram showing aberrations of the projection lens system according to the second example of the first embodiment;

FIG. 6 is a diagram showing aberrations of the projection lens system according to the third example of the first embodiment;

FIG. 16 is a diagram showing aberrations of the projection lens system according to the second example of the third embodiment;

FIG. 24 is a diagram showing aberrations of the projection lens system according to the second example of the fifth embodiment.

DESCRIPTION OF THE PREFERRED EMBODIMENTS

Hereafter, the invention will be described in detail with reference to the drawings illustrating embodiments thereof.

In each table given hereinafter which shows each embodiment, R denotes a radius of curvature, d denotes a surface-to-surface interval, N denotes a refractive index at a predetermined wavelength (543 nm in the first embodiment (TABLE-1 to TABLE-4) and 545 nm in the second to the fifth embodiments (TABLE-5 to TABLE-12), $\nu$ denotes Abbe number, and Si denotes a surface number of an i-th surface counted From a screen side OBJ to an image side IMG. The configuration of an aspherical surface is expressed by the equation below:

$$x = \frac{P^2/R}{1 + [1 - (1 + cc)(P/R)^2]^{\frac{1}{2}}} + A_4 P^4 + A_6 P^6 + A_8 P^8 + A_{10} P^{10}$$

where the optical axis is x, a direction perpendicular to the optical axis is P, a conic coefficient is cc and a polynomial deformation term is Aj (j=4, 6, 8, 10).

First Embodiment

A projection lens system according to the first embodiment of the present invention (the first invention) will be described in the following. As shown in FIGS. 1, 3, 5 and 7, for example, the projection lens system according to the first embodiment has a first lens L1 to a sixth lens L6 which are serially arranged from the screen side not shown. The first lens L1 has a meniscus configuration in which a convex surface is directed toward the screen side and the power of the first lens L1 is positive near the optical axis and changes to negative with a distance from the optical axis toward a peripheral portion of the lens. The first lens L1 has two aspherical surfaces. The second lens L2 has a positive power meniscus configuration in which a convex surface is directed toward the screen side and has two aspherical surfaces. The third lens L3 has a positive power meniscus configuration in which a convex surface is directed toward the screen side. The fourth lens L4 is disposed close to the third lens L3 and has two convex surfaces. The fifth lens L5 has a positive power meniscus configuration in which a concave surface is directed toward the screen side and has two aspherical surfaces. The sixth lens L6 has a concave surface which has a large curvature directed toward the screen side, and the surface on the screen side includes an aspherical surface. The projection lens system according to the first embodiment satisfies the respective conditions (1) to (4) described earlier. A fluorescent screen has a spherical configuration of 350 R having a concave surface directed toward the screen side.

(First Example)

Figure 1:
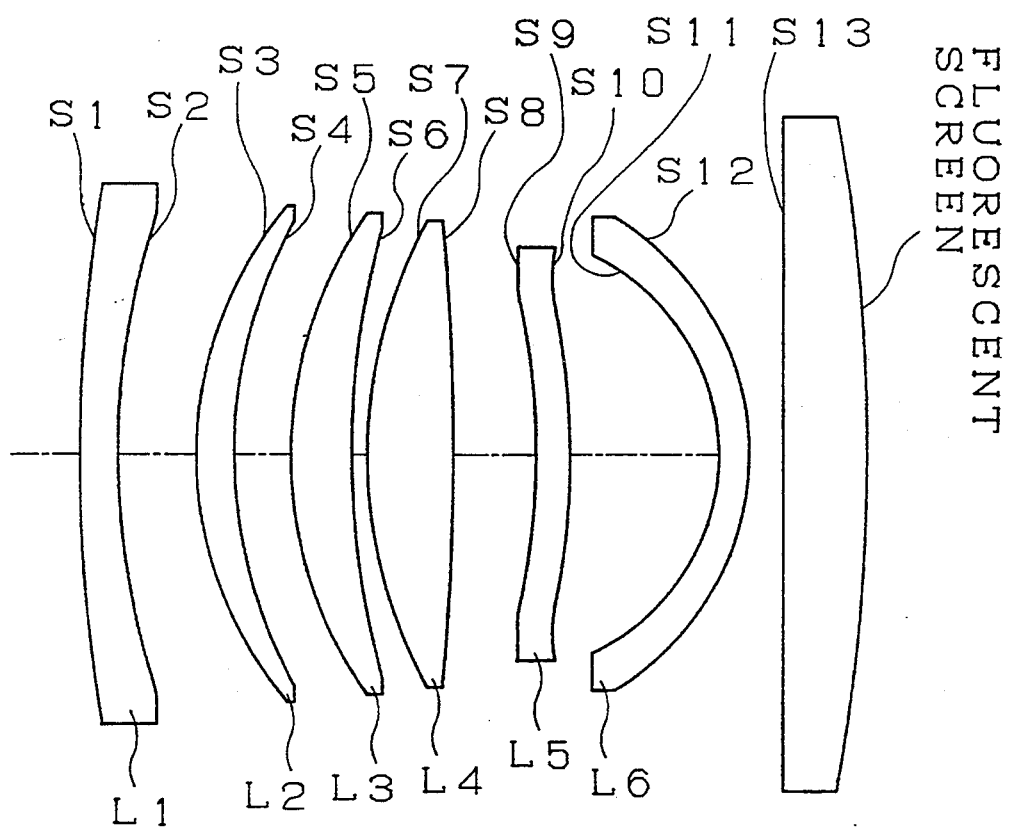
FIG. 1 is a construction diagram of a projection lens system according to a first example of a first embodiment.

TABLE-1 shows the construction of a projection lens system according to a first example of the first embodiment. FIGS. 1 and 2 are a construction diagram and a view showing aberrations, respectively, of the projection lens system according to the first example of the first embodiment.

TABLE 1

|      | R         | d      | N        | $\nu$ |
|------|-----------|--------|----------|-------|
| OBJ: | INFINITY  |        |          |       |
|      |           | 690.11 |          |       |
| S1:  | 149.49    |        | 1.491742 | 55.4  |
|      |           | 5.00   |          |       |
| S2:  | 236.37    |        |          |       |
|      |           | 10.31  |          |       |
| S3:  | 58.05     |        | 1.491742 | 55.4  |
|      |           | 4.63   |          |       |
| S4:  | 56.85     |        |          |       |
|      |           | 8.45   |          |       |
| S5:  | 57.25     |        | 1.591614 | 61.3  |
|      |           | 9.78   |          |       |
| S6:  | 155.36    |        |          |       |
|      |           | 2.20   |          |       |
| S7:  | 75.45     |        | 1.591614 | 61.3  |
|      |           | 12.63  |          |       |
| S8:  | −186.76   |        |          |       |
|      |           | 10.31  |          |       |
| S9:  | −125.80   |        | 1.489192 | 55.4  |
|      |           | 4.61   |          |       |
| S10: | −73.37    |        |          |       |
|      |           | 21.96  |          |       |
| S11: | −36.44    |        | 1.500828 | 53.5  |
|      |           | 4.00   |          |       |
| S12: | −40.03    |        | 1.420804 | 73.2  |
|      |           | 5.00   |          |       |
| S13: | INFINITY  |        | 1.565803 | 55.2  |
|      |           | 11.00  |          |       |
| IMG: | −350.00   |        |          |       |

|      | cc         | A4            | A6            | A8           | A10           |
|------|------------|---------------|---------------|--------------|---------------|
| S1:  | −11.012837 | −0.622232E-8  | −0.540405E-9  | 0.838308E-13 | 0.362492E-16  |
| S2:  | 29.541618  | 0.922096E-6   | −0.214067E-9  | −0.227240E-12| 0.120106E-15  |
| S3:  | −0.117781  | 0.339056E-6   | −0.229966E-9  | 0.106975E-11 | −0.286155E-15 |
| S4:  | −2.325795  | 0.913516E-8   | 0.174294E-10  | 0.172016E-11 | −0.409474E-15 |
| S9:  | 6.468957   | −0.331225E-5  | 0.252771E-8   | 0.115166E-10 | −0.812458E-14 |
| S10: | 0.150805   | −0.458953E-7  | −0.420832E-10 | 0.167681E-10 | −0.103429E-13 |
| S11: | 0.416094   | −0.533721E-5  | 0.143299E-8   | 0.380931E-11 | −0.235491E-14 |

(Second Example)

Figure 3:
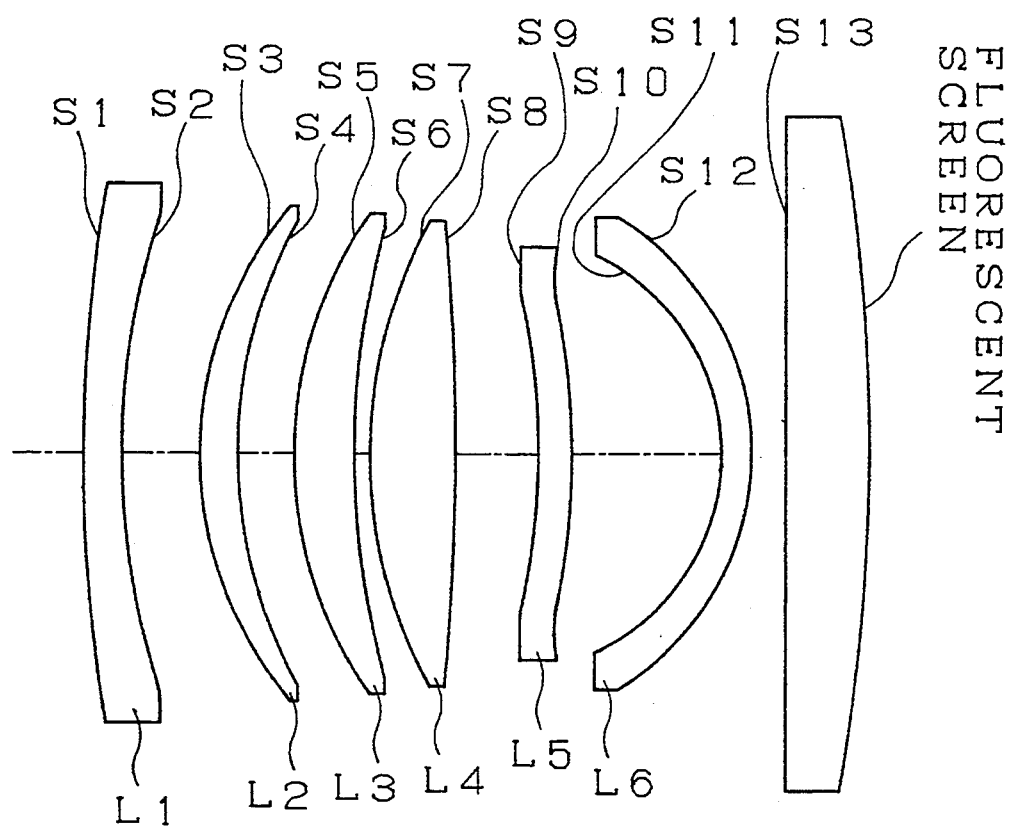
FIG. 3 is a construction diagram of a projection lens system according to a second example of the first embodiment.

TABLE-2 shows the construction of a projection lens system according to a second example of the first embodiment. FIGS. 3 and 4 are a construction diagram and a view showing aberrations, respectively, of the projection lens system according to the second example of the first embodiment.

TABLE 2

|      | R        | d | N | $\nu$ |
|------|----------|---|---|-------|
| OBJ: | INFINITY |   |   |       |

TABLE 2-continued

| | | | | |
|---|---|---|---|---|
| | | 690.13 | | |
| S1: | 149.52 | | 1.491742 | 55.4 |
| | | 5.00 | | |
| S2: | 236.52 | | | |
| | | 10.25 | | |
| S3: | 58.02 | | 1.491742 | 55.4 |
| | | 4.65 | | |
| S4: | 56.85 | | | |
| | | 8.47 | | |
| S5: | 57.24 | | 1.591614 | 61.3 |
| | | 9.78 | | |
| S6: | 155.23 | | | |
| | | 2.20 | | |
| S7: | 75.52 | | 1.591614 | 61.3 |
| | | 12.64 | | |
| S8: | −185.51 | | | |
| | | 10.34 | | |
| S9: | −124.15 | | 1.489192 | 55.4 |
| | | 4.60 | | |
| S10: | −72.89 | | | |
| | | 21.93 | | |
| S11: | −36.40 | | 1.500828 | 53.5 |
| | | 4.00 | | |
| S12: | −40.12 | | 1.420804 | 73.2 |
| | | 5.00 | | |
| S13: | INFINITY | | 1.565803 | 55.2 |
| | | 11.00 | | |
| IMG: | −350.00 | | | |

| | cc | A4 | A6 | A8 | A10 |
|---|---|---|---|---|---|
| S1: | −10.956528 | −0.622907E-6 | −0.541402E-9 | 0.833478E-13 | 0.361057E-16 |
| S2: | 29.525764 | 0.928301E-6 | −0.216383E-9 | −0.227761E-12 | 0.119642E-15 |
| S3: | −0.119726 | 0.341349E-6 | −0.227551E-9 | 0.106886E-11 | −0.287335E-15 |
| S4: | −2.336683 | 0.148006E-7 | 0.210561E-10 | 0.172013E-11 | −0.409047E-15 |
| S9: | 6.795873 | −0.332019E-5 | 0.254490E-8 | 0.116599E-10 | −0.821512E-14 |
| S10: | 0.195697 | −0.662184E-7 | −0.592867E-10 | 0.169306E-10 | −0.104531E-13 |
| S11: | 0.413122 | −0.529726E-5 | 0.135301E-8 | 0.394506E-11 | −0.242710E-14 |

(Third Example)

Figure 5:
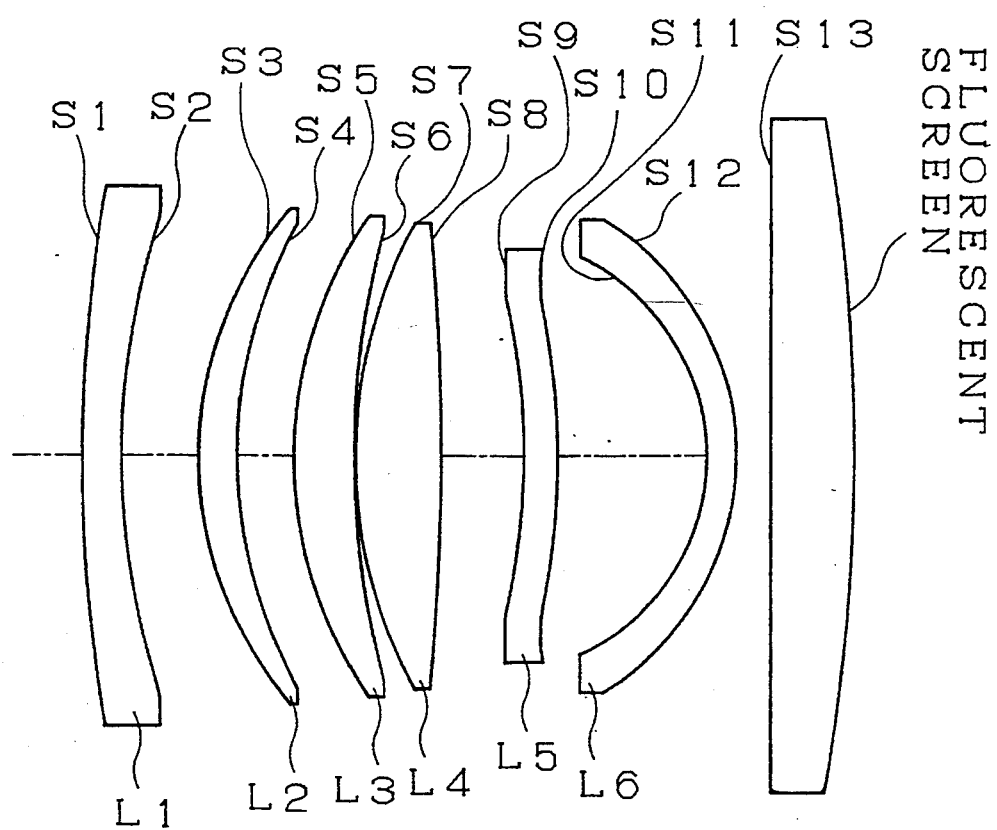
FIG. 5 is a construction diagram of a projection lens system according to a third example of the first embodiment.

TABLE-3 shows the construction of a projection lens system according to a third example of the first embodiment. FIGS. 5 and 6 are a construction diagram and a view showing aberrations, respectively, of the projection lens system according to the third example of the first embodiment.

TABLE 3

| | R | d | N | ν |
|---|---|---|---|---|
| OBJ: | INFINITY | | | |
| | | 697.17 | | |
| S1: | 149.45 | | 1.491742 | 55.4 |
| | | 4.00 | | |
| S2: | 252.24 | | | |
| | | 6.26 | | |
| S3: | 41.38 | | 1.491742 | 55.4 |
| | | 4.80 | | |
| S4: | 46.36 | | | |
| | | 10.89 | | |
| S5: | 60.08 | | 1.518881 | 64.2 |
| | | 6.28 | | |
| S6: | 100.91 | | | |
| | | 0.50 | | |
| S7: | 71.40 | | 1.591617 | 61.3 |
| | | 13.49 | | |
| S8: | −136.20 | | | |
| | | 10.20 | | |
| S9: | −188.33 | | 1.489192 | 55.4 |
| | | 4.91 | | |
| S10: | −75.63 | | | |
| | | 19.49 | | |
| S11: | −33.98 | | 1.486165 | 55.4 |
| | | 4.00 | | |
| S12: | −42.52 | | 1.420804 | 73.2 |
| | | 7.00 | | |
| S13: | INFINITY | | 1.565803 | 55.2 |
| | | 11.00 | | |
| IMG: | −350.00 | | | |

| | cc | A4 | A6 | A8 | A10 |
|---|---|---|---|---|---|
| S1: | −8.658822 | −0.545389E-6 | −0.619467E-9 | 0.788221E-13 | 0.457781E-16 |
| S2: | 33.847817 | 0.733093E-6 | −0.274917E-9 | −0.704158E-13 | 0.101928E-15 |
| S3: | −0.693181 | −0.111062E-5 | −0.569435E-9 | 0.129346E-11 | −0.295040E-15 |
| S4: | −2.545453 | −0.359103E-6 | −0.410195E-9 | 0.188600E-11 | −0.272767E-15 |

TABLE 3-continued

| | | | | |
|---|---|---|---|---|
| S9: | 5.393079 | −0.152649E-5 | −0.944574E-9 | 0.101603E-10 | −0.206334E-14 |
| S10: | −1.268523 | 0.411058E-6 | −0.148730E-8 | 0.109447E-10 | −0.139822E-14 |
| S11: | 0.315579 | −0.747705E-5 | 0.367236E-8 | 0.431275E-11 | −0.538622E-14 |

(Fourth Example)

Figure 7:
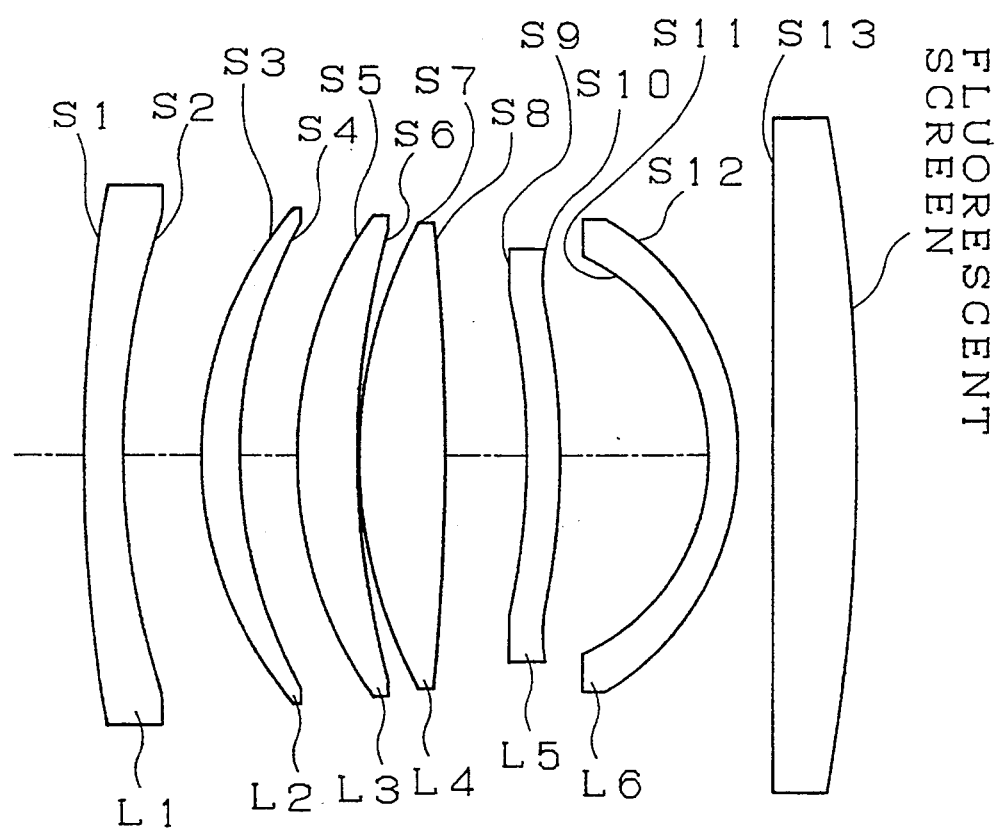
FIG. 7 is a construction diagram of a projection lens system according to a fourth example of the first embodiment.
Figure 8A:
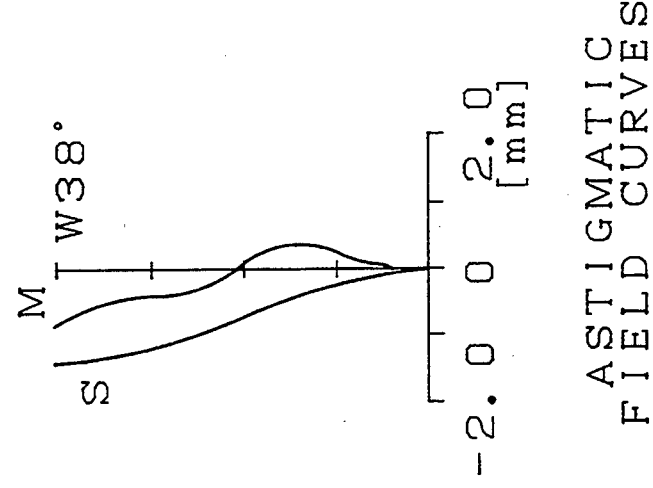
FIG. 8 is a diagram showing aberrations of the projection lens system according to the fourth example of the first embodiment.
Figure 8B:
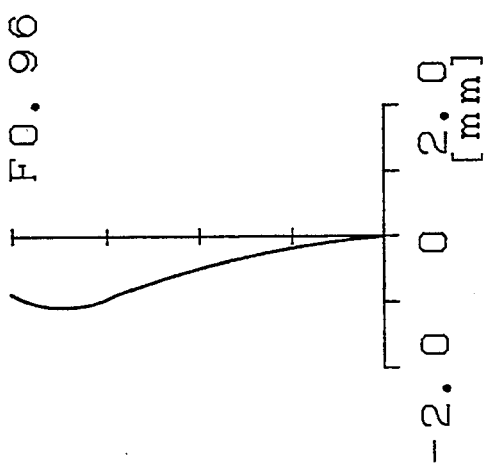

TABLE-4 shows the construction of a projection lens system according to a fourth example of the first embodiment. FIGS. 7 and 8 are a construction diagram and a view showing aberrations, respectively, of the projection lens system according to the fourth example of the first embodiment.

use of the design performance of the projection lens systems during operation thereof.

Second Embodiment

Figure 9:
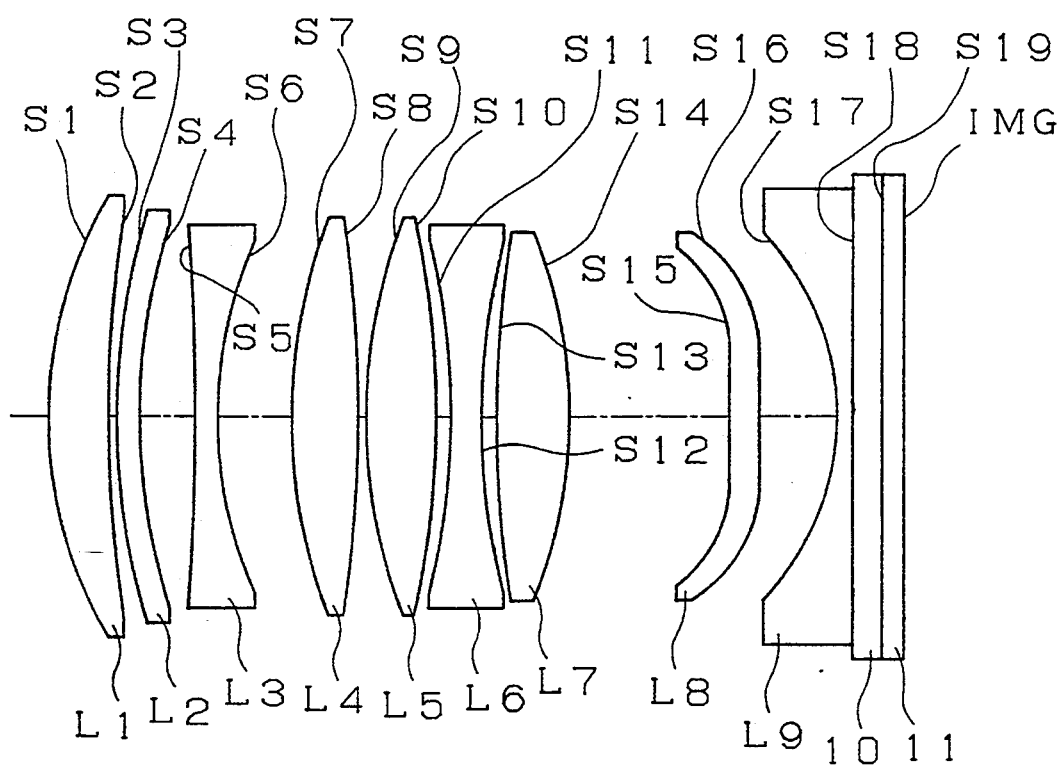
FIG. 9 is a construction diagram of a projection lens system according to a first example of a second embodiment.
Figure 11:
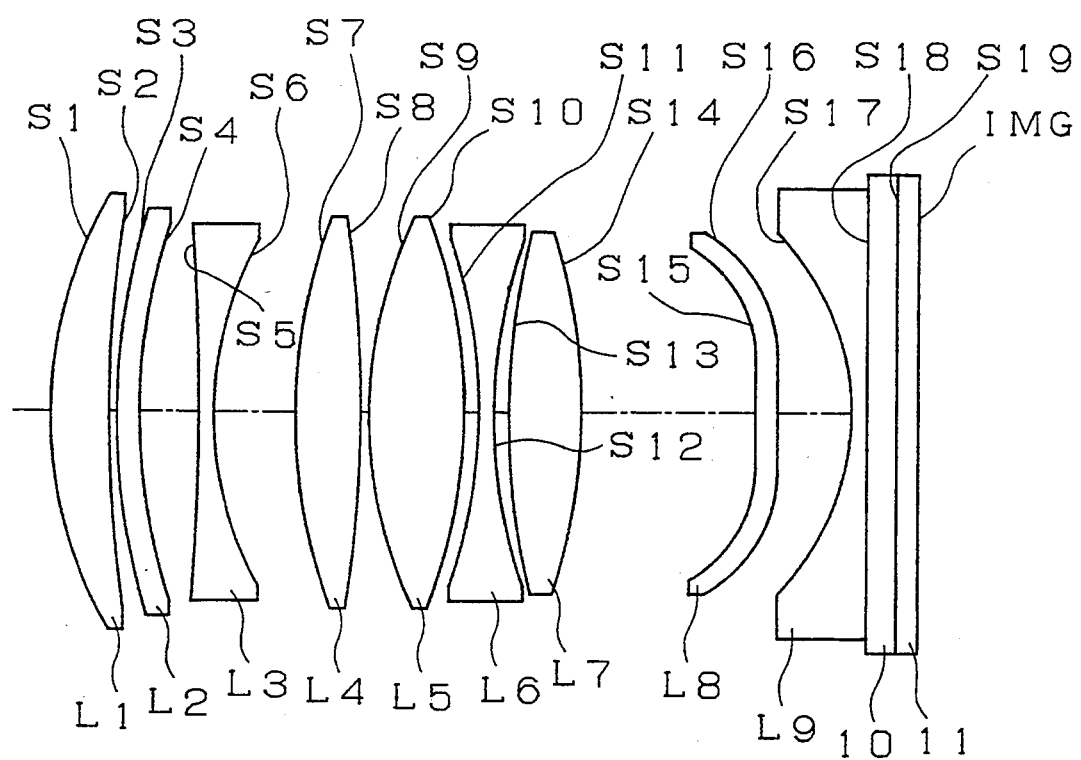
FIG. 11 is a construction diagram of a projection lens system according to a second example of the second embodiment.

A projection lens system according to the second embodiment of the present invention (the second invention) will be described in the following. As shown in FIGS. 9 and 11, for example, the projection lens system

TABLE 4

| | R | d | N | ν |
|---|---|---|---|---|
| OBJ: | INFINITY | | | |
| | | 697.17 | | |
| S1: | 146.99 | | 1.494250 | 55.4 |
| | | 4.00 | | |
| S2: | 233.33 | | | |
| | | 5.59 | | |
| S3: | 41.78 | | 1.494250 | 55.4 |
| | | 4.94 | | |
| S4: | 47.33 | | | |
| | | 11.52 | | |
| S5: | 60.05 | | 1.518881 | 64.2 |
| | | 6.27 | | |
| S6: | 100.92 | | | |
| | | 0.50 | | |
| S7: | 71.41 | | 1.591617 | 61.3 |
| | | 13.39 | | |
| S8: | −135.80 | | | |
| | | 10.16 | | |
| S9: | −228.08 | | 1.494250 | 55.4 |
| | | 5.50 | | |
| S10: | −80.18 | | | |
| | | 18.97 | | |
| S11: | −33.97 | | 1.494250 | 55.4 |
| | | 4.00 | | |
| S12: | −42.40 | | 1.426085 | 73.2 |
| | | 7.00 | | |
| S13: | INFINITY | | 1.542800 | 56.6 |
| | | 11.00 | | |
| IMG: | −350.00 | | | |

| | cc | A4 | A6 | A8 | A10 |
|---|---|---|---|---|---|
| S1: | −4.234280 | −0.406071E-6 | −0.641919E-9 | −0.437813E-14 | 0.718733E-16 |
| S2: | 29.238857 | 0.991811E-6 | −0.412773E-9 | −0.239479E-13 | 0.717838E-16 |
| S3: | −0.737399 | −0.113686E-5 | −0.796438E-9 | 0.135853E-11 | −0.220834E-15 |
| S4: | −2.897055 | −0.285416E-6 | −0.601428E-9 | 0.174794E-11 | −0.106635E-15 |
| S9: | −3.843933 | −0.151145E-5 | 0.810988E-9 | 0.690618E-11 | −0.144482E-14 |
| S10: | −2.263137 | 0.621618E-6 | −0.981828E-9 | 0.101831E-10 | −0.230423E-14 |
| S11: | 0.318385 | −0.691204E-5 | 0.448465E-8 | 0.135042E-11 | −0.252242E-14 |

In the projection lens systems according to the first embodiment (the first invention) as described above, the half field angle is equal to or larger than 38 degrees, showing that the respective projection lens systems have a wide angle. The respective projection lens systems also ensure brightness which is obtainable when the relative aperture is 1 or less. This makes it possible to provide a projection television which promises enough brightness even when equipped with a small CRT and which is reduced in depth and hence in overall size. In addition, since aspherical lenses which have aspherical surfaces which have a small aspheric sag and hence which can be finished with accuracy ace included in both forward lenses and rear lenses in the respective projection lens systems, various off-axis aberrations are satisfactorily corrected and therefore an image is formed at an excellent image formation accuracy all over the projection screen. Moreover, designed while taking a temperature distribution into consideration, the respective projection lens systems allow for maximum according to the second embodiment has a first lens L1 to a ninth lens L9 which are serially arranged in this order from the screen side not shown. The first lens L1 has a positive power meniscus configuration in which a convex surface is directed toward the screen side. The second lens L2 has a positive power meniscus configuration in which a convex surface is directed toward the screen side and has two aspherical surfaces. The third lens L3 is a negative lens, the fourth lens L4 is a positive lens, the fifth lens L5 is a positive lens, and the sixth lens L6 is a negative lens. The seventh lens L7 is located close to the sixth lens L6 and is a positive lens. The eighth lens L8 has a meniscus configuration in which a concave surface is directed toward the screen side and has two aspherical surfaces. The ninth lens L9 is a negative lens. The projection lens systems according to the second embodiment satisfies the conditions (5) and (6) described earlier. In the drawings, indicated at numerical reference 10 is a cooling fluid and indicated at numerical reference 11 is a CRT face plate.

(First Example)

Figure 10C:
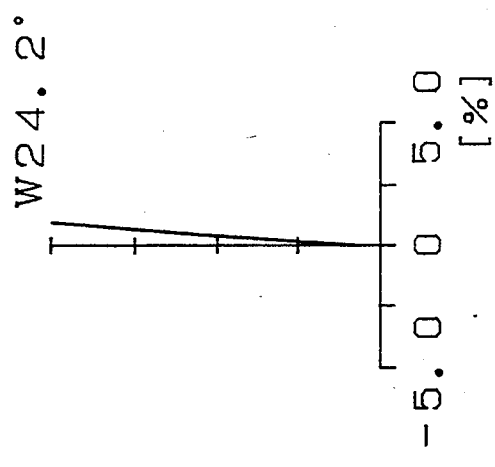
FIG. 10 is a diagram showing aberrations of the projection lens system according to the First example of the second embodiment.
Figure 10B:
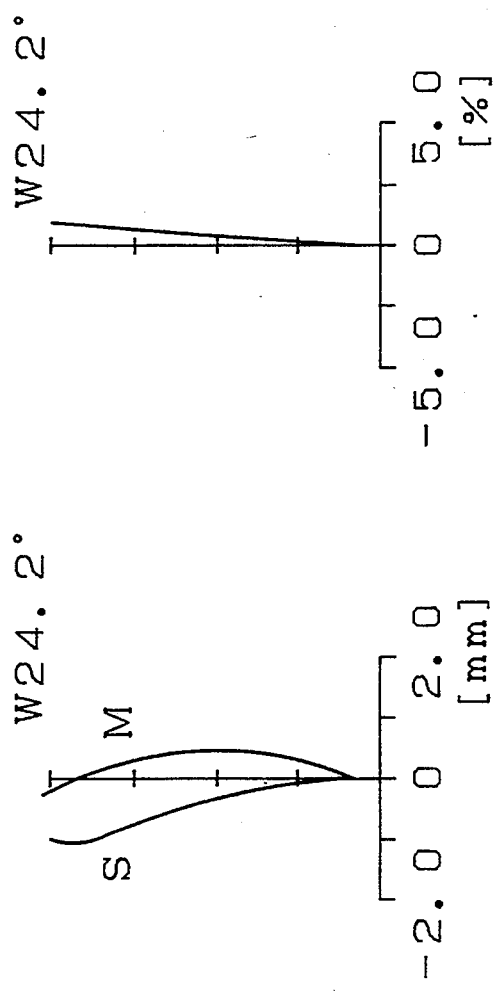
Figure 10A:
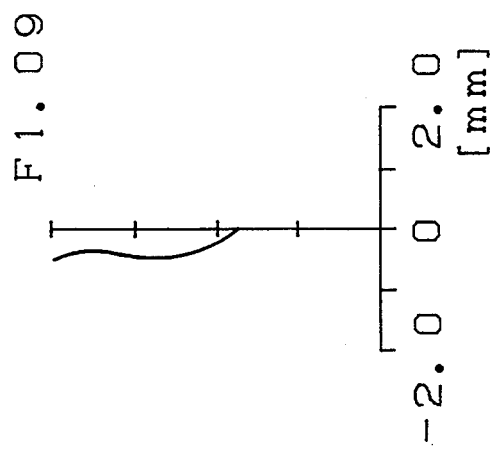

TABLE-5 shows the construction of a projection lens system according to a first example of the second embodiment. FIGS. 9 and 10 are a construction diagram and a view showing aberrations, respectively, of the projection lens system according to the first example of the second embodiment.

TABLE 5 fno. = 1.09   W = 24.2°
f = 224.86   f45 = 159.50   f6 = −284.35   f7 = 288.67

|     | R           | d           | N        | ν    |
|-----|-------------|-------------|----------|------|
| OBJ: | INFINITY   | 2726.590714 |          |      |
| S1: | 189.28600   | 30.846431   | 1.591493 | 61.3 |
| S2: | 584.55200   | 2.205591    | 1        |      |
| S3: | 403.26545   | 13.470827   | 1.491954 | 55.4 |
| S4: | 608.91920   | 28.939889   | 1        |      |
| S5: | −904.76000  | 7.365880    | 1.624206 | 36.3 |
| S6: | 194.92000   | 35.298798   | 1        |      |
| S7: | 270.60000   | 32.587343   | 1.591493 | 61.3 |
| S8: | −633.71600  | 3.034538    | 1        |      |
| S9: | 236.17000   | 34.875504   | 1.591493 | 61.3 |
| S10: | −593.88000 | 8.226973    | 1        |      |
| S11: | −568.84000 | 14.064038   | 1.624206 | 36.3 |
| S12: | 260.44000  | 6.771413    | 1        |      |
| S13: | 412.43400  | 35.000000   | 1.591493 | 61.3 |
| S14: | −282.19000 | 77.387553   | 1        |      |
| S15: | −531.30067 | 16.337333   | 1.489374 | 55.4 |
| S16: | −537.19598 | 35.568280   | 1        |      |
| S17: | −126.71800 | 6.388897    | 1.624206 | 36.3 |
| S18: | INFINITY   | 15.000000   | 1.401856 |      |
| S19: | INFINITY   | 11.000000   | 1.539678 |      |
| IMG: | INFINITY   |             |          |      |

|      | cc       | A4             | A6             | A8            | A10            |
|------|----------|----------------|----------------|---------------|----------------|
| S3:  | 5.000000 | 0.232910E-07   | 0.287592E-11   | 0.442108E-15  | −0.339607E-19  |
| S4:  | 5.000000 | 0.712284E-07   | 0.305053E-11   | 0.753804E-15  | −0.448638E-19  |
| S15: | 0.270342 | −0.264630E-06  | −0.144235E-10  | 0.406866E-15  | −0.155276E-18  |
| S16: | 1.821094 | −0.236290E-06  | −0.155106E-10  | 0.718309E-15  | −0.822644E-19  |

(Second Example)

Figures 12A, 12B, 12C:
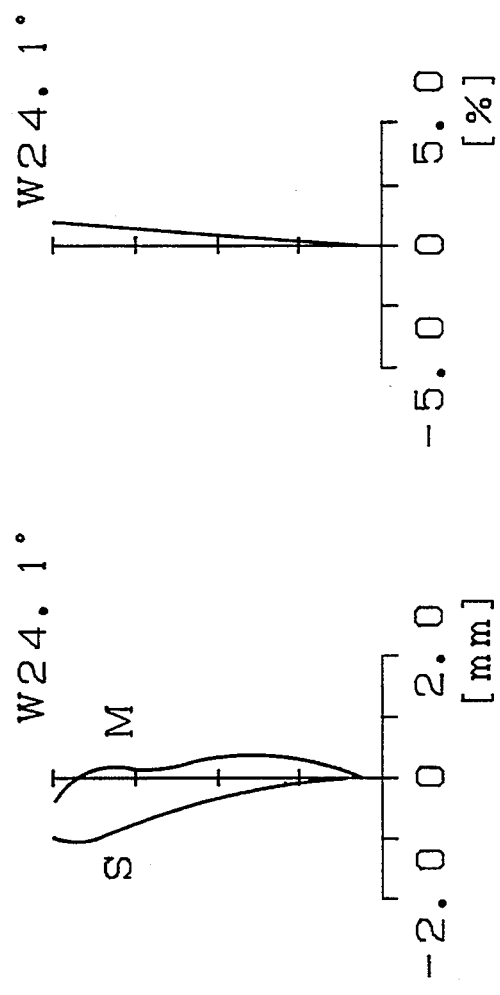
FIG. 12 is a diagram showing aberrations of the projection lens system according to the second example of the second embodiment.

TABLE-6 shows the construction of a projection lens system according to a second example of the second embodiment. FIGS. 11 and 12 are a construction diagram and a view showing aberrations, respectively, of the projection lens system according to the second example of the second embodiment.

TABLE 6 fno. = 1.09   W = 24.1°
f = 224.84   f45 = 175.49   f6 = −340.20   f7 = 306.59

|     | R            | d           | N        | ν    |
|-----|--------------|-------------|----------|------|
| OBJ: | INFINITY    | 2736.743053 |          |      |
| S1: | 180.39177    | 32.802875   | 1.591493 | 61.3 |
| S2: | 752.21962    | 2.205591    | 1        |      |
| S3: | 332.29388    | 12.000000   | 1.494135 | 55.4 |
| S4: | 550.00620    | 23.699219   | 1        |      |
| S5: | −1835.359-03 | 7.365880    | 1.624206 | 36.3 |
| S6: | 163.29793    | 39.763999   | 1        |      |
| S7: | 235.23342    | 30.699717   | 1.591493 | 61.3 |
| S8: | −9968.806-75 | 5.000000    | 1        |      |
| S9: | 295.39160    | 35.000000   | 1.591493 | 61.3 |
| S10: | −398.57115  | 5.103304    | 1        |      |
| S11: | −524.56807  | 7.365880    | 1.624206 | 36.3 |
| S12: | 358.70769   | 6.160862    | 1        |      |
| S13: | 368.86416   | 35.000000   | 1.591493 | 61.3 |
| S14: | −344.14859  | 82.092444   | 1        |      |
| S15: | −619.28043  | 12.000000   | 1.494135 | 55.4 |
| S16: | −621.10919  | 35.568280   | 1        |      |
| S17: | −123.63279  | 6.388897    | 1.624206 | 36.3 |
| S18: | INFINITY    | 15.000000   | 1.401856 |      |
| S19: | INFINITY    | 11.000000   | 1.539678 |      |
| IMG: | INFINITY    |             |          |      |

|      | cc        | A4             | A6             | A8            | A10            |
|------|-----------|----------------|----------------|---------------|----------------|
| S3:  | −1.759106 | −0.937794E-08  | 0.242698E-11   | 0.414350E-15  | −0.324464E-19  |
| S4:  | −3.3191   | 0.211392E-07   | 0.281408E-11   | 0.586790E-15  | −0.426418E-19  |
| S15: | −5.000000 | −0.325251E-06  | −0.194707E-10  | 0.150776E-15  | −0.107923E-18  |
| S16: | −5.000000 | −0.278553E-06  | −0.263582E-10  | 0.168622E-14  | −0.119529E-18  |

In each one of the projection lens systems according to the second embodiment (the second invention), since aspherical plastic lenses are employed, the relative aperture and the total field angle are advantageously large 1.09 and 48 degrees, respectively, and the image formation performance is excellent despite a decreased number of lenses used in the lens system, thereby opening the way to reduction in the manufacturing cost and the weight of the lens system. In addition, since the aspherical plastic lenses are finished in such a configuration which does not have a light converging function, defocusing of an image due to a temperature change is suppressed as much as possible. Still further, in the projection lens systems according to the second embodiment, if the weight of the lenses employed therein is restricted by designing the systems so that the respective conditions (7) to (10) mentioned earlier are satisfied, increased diameters of the lenses over 200 mm would not result in difficulty in manufacturing and assembling the lenses, which in turn reduces the cost.

Third Embodiment

Figure 13:
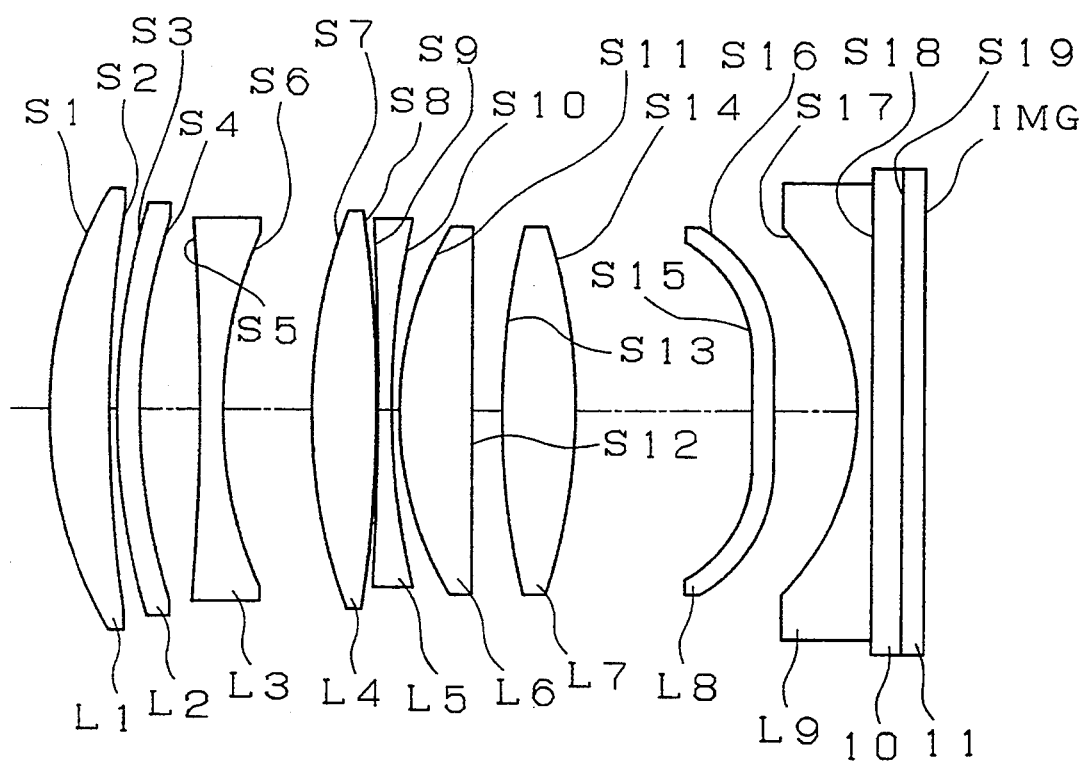
FIG. 13 is a construction diagram of a projection lens system according to a first example of a third embodiment.
Figure 15:
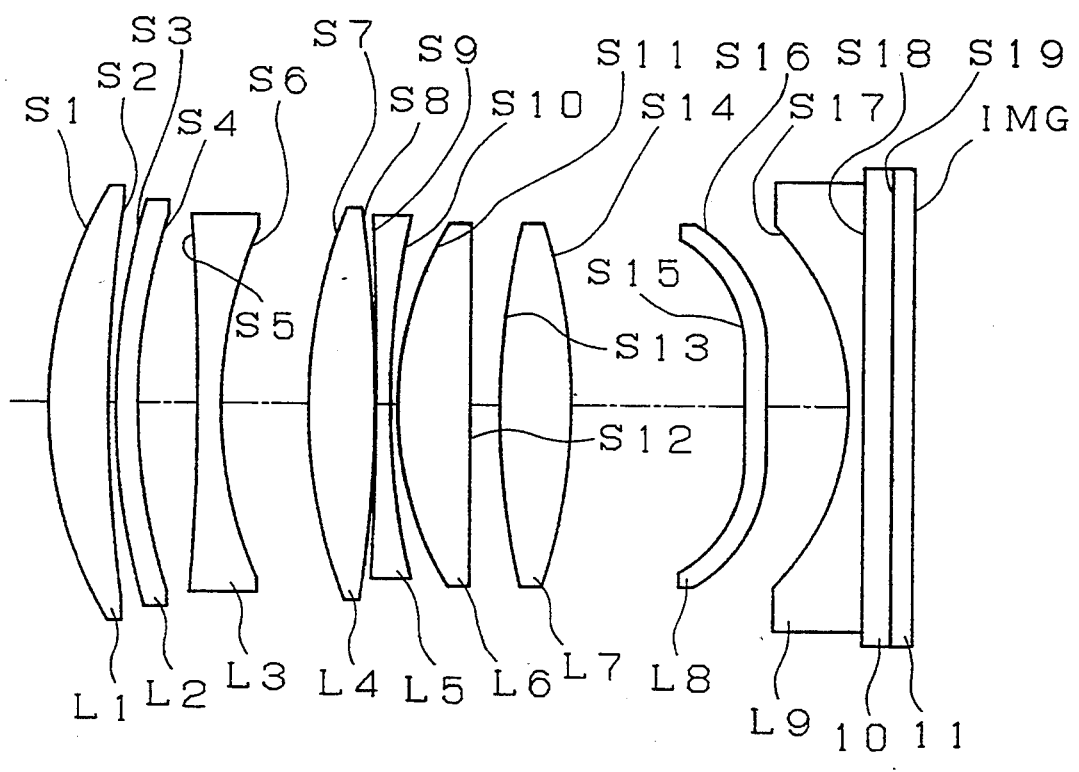
FIG. 15 is a construction diagram of a projection lens system according to a second example of the third embodiment.

A projection lens system according to the third embodiment of the present invention (the third invention) will be described in the following. As shown in FIGS. 13 and 15, for example, the projection lens system according to the third embodiment has a first lens L1 to a ninth lens L9 which are serially arranged in this order from the screen side not shown. The first lens L1 has a positive power meniscus configuration in which a convex surface is directed toward the screen side. The second lens L2 has a positive power meniscus configuration in which a convex surface is directed toward the screen side and has two aspherical surfaces. The third lens L3 is a negative lens, the fourth lens L4 is a positive lens, the fifth lens L5 is a negative lens, the sixth lens L6 is a positive lens, and the seventh lens L9 is a positive lens. The eighth lens L8 has a meniscus configuration in which a concave surface is directed toward the screen side and has two aspherical surfaces. The ninth lens L9 is a negative lens. The projection lens system according to the third embodiment satisfies the respective conditions (11) and (12) described earlier.

(First Example)

Figures 14A, 14B, 14C:
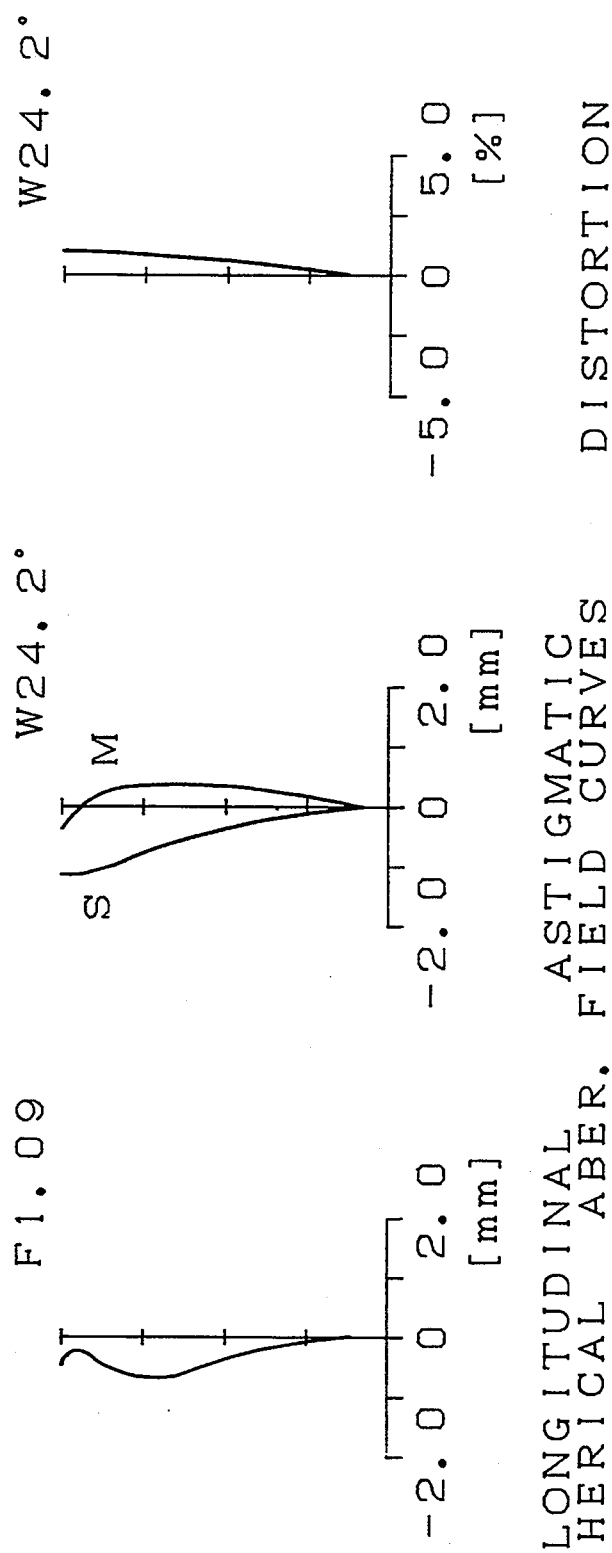
FIG. 14 is a diagram showing aberrations of the projection lens system according to the first example of the third embodiment.

TABLE-7 shows the construction of a projection lens system according to a first example of the third embodiment. FIGS. 13 and 14 are a construction diagram and a view showing aberrations, respectively, of the projection lens system according to the first example of the third embodiment.

TABLE 7 fno. = 1.09   W = 24.2°
f = 224.85   f45 = 262.30   f5 = −371.28   f67 = 198.26

|  | R | d | N | ν |
|---|---|---|---|---|
| OBJ: | INFINITY | 2730.009011 | | |
| S1: | 181.76279 | 26.928590 | 1.591493 | 61.3 |
| S2: | 584.08265 | 2.286111 | 1 | |
| S3: | 325.86330 | 11.714812 | 1.494135 | 55.4 |
| S4: | 644.05774 | 28.503973 | 1 | |
| S5: | −3547.59773 | 7.634789 | 1.624206 | 36.3 |
| S6: | 160.62059 | 37.497386 | 1 | |
| S7: | 228.80417 | 34.987900 | 1.591493 | 61.3 |
| S8: | −454.54670 | 2.000000 | 1 | |
| S9: | −560.21264 | 4.000000 | 1.624206 | 36.3 |
| S10: | 369.35916 | 5.100000 | 1 | |
| S11: | 224.02113 | 35.000000 | 1.591493 | 61.3 |
| S12: | −6477.44765 | 15.640048 | 1 | |
| S13: | 451.74306 | 35.000000 | 1.591493 | 61.3 |
| S14: | −422.03373 | 79.913403 | 1 | |
| S15: | −296.80233 | 14.662550 | 1.494135 | 55.4 |
| S16: | −291.70945 | 36.866788 | 1 | |
| S17: | −117.69284 | 6.622139 | 1.624206 | 36.3 |
| S18: | INFINITY | 15.592500 | 1.401856 | |
| S19: | INFINITY | 11.000000 | 1.539678 | |
| IMG: | INFINITY | | | |

|  | cc | A4 | A6 | A8 | A10 |
|---|---|---|---|---|---|
| S3: | 2.741001 | −0.869624E-08 | 0.639418E-11 | 0.133014E-15 | 0.146732E-19 |
| S4: | 5.000000 | 0.287839E-07 | 0.848446E-11 | −0.453967E-16 | 0.359701E-19 |
| S15: | −4.781015 | −0.302646E-06 | −0.114207E-10 | −0.203338E-15 | −0.595739E-19 |
| S16: | −3.036107 | −0.247565E-06 | −0.134500E-10 | 0.587462E-15 | −0.617690E-19 |

(Second Example)

TABLE-8 shows the construction of a projection lens system according to a second example of the third embodiment. FIGS. 15 and 16 are a construction diagram and a view showing aberrations, respectively, of the projection lens system according to the second example of the third embodiment.

TABLE 8 fno. = 1.09   W = 24.2°
f = 224.83   f45 = 299.00   f5 = −454.59   f67 = 198.15

|  | R | d | N | ν |
|---|---|---|---|---|
| OBJ: | INFINITY | 2730.373752 | | |
| S1: | 182.45451 | 27.873801 | 1.591493 | 61.3 |
| S2: | 593.44481 | 2.286111 | 1 | |
| S3: | 325.04759 | 11.658987 | 1.494135 | 55.4 |
| S4: | 629.81840 | 28.054937 | 1 | |
| S5: | −3737.84804 | 7.634789 | 1.624206 | 36.3 |
| S6: | 161.44717 | 36.694293 | 1 | |
| S7: | 230.27617 | 35.000000 | 1.591493 | 61.3 |
| S8: | −719.09399 | 2.000000 | 1 | |
| S9: | −1049.01365 | 4.000000 | 1.624206 | 36.3 |
| S10: | 389.93816 | 5.627485 | 1 | |
| S11: | 223.16635 | 34.701033 | 1.591493 | 61.3 |

TABLE 8-continued

|  | R | d | N | ν |
|---|---|---|---|---|
| S12: | −4875.27084 | 15.640048 | 1 | |
| S13: | 484.63235 | 35.000000 | 1.591493 | 61.3 |
| S14: | −406.39555 | 79.882204 | 1 | |
| S15: | −288.03631 | 14.451132 | 1.494135 | 55.4 |
| S16: | −287.25613 | 36.866788 | 1 | |
| S17: | −117.88385 | 6.622139 | 1.624206 | 36.3 |
| S18: | INFINITY | 15.592500 | 1.401856 | |
| S19: | INFINITY | 11.000000 | 1.539678 | |
| IMG: | INFINITY | | | |

|  | cc | A4 | A6 | A8 | A10 |
|---|---|---|---|---|---|
| S3: | 2.697278 | −0.895645E-08 | 0.639180E-11 | 0.131085E-15 | 0.141669E-19 |
| S4: | 5.000000 | 0.285974E-07 | 0.845958E-11 | −0.481453E-16 | 0.363277E-19 |
| S15: | −4.855806 | −0.301760E-06 | −0.112892E-10 | −0.197328E-15 | −0.596707E-19 |
| S16: | −3.318269 | −0.246958E-06 | −0.134750E-10 | 0.587953E-15 | −0.614153E-19 |

In each one of the projection lens systems according to the third embodiment (the third invention), since aspherical plastic lenses are employed, the relative aperture and the total field angle are advantageously large 1.09 and 48 degrees, respectively, and the image formation performance is excellent despite a decreased number of lenses used in the lens system, thereby opening the way to reduction in the manufacturing cost and the weight of the lens system. In addition, since the aspherical plastic lenses are finished in such a configuration which does not have a light converging function, defocusing of an image due to a temperature change is suppressed as much as possible. Still further, the projection lens systems according to the third embodiment, if the weight of the lenses employed therein is restricted by designing the systems so that the respective conditions (13) to (16) mentioned earlier are satisfied, increased diameters of the lenses over 200 mm would not result in difficulty in manufacturing and assembling the lenses, which in turn reduce the cost.

Fourth Embodiment

Figure 17:
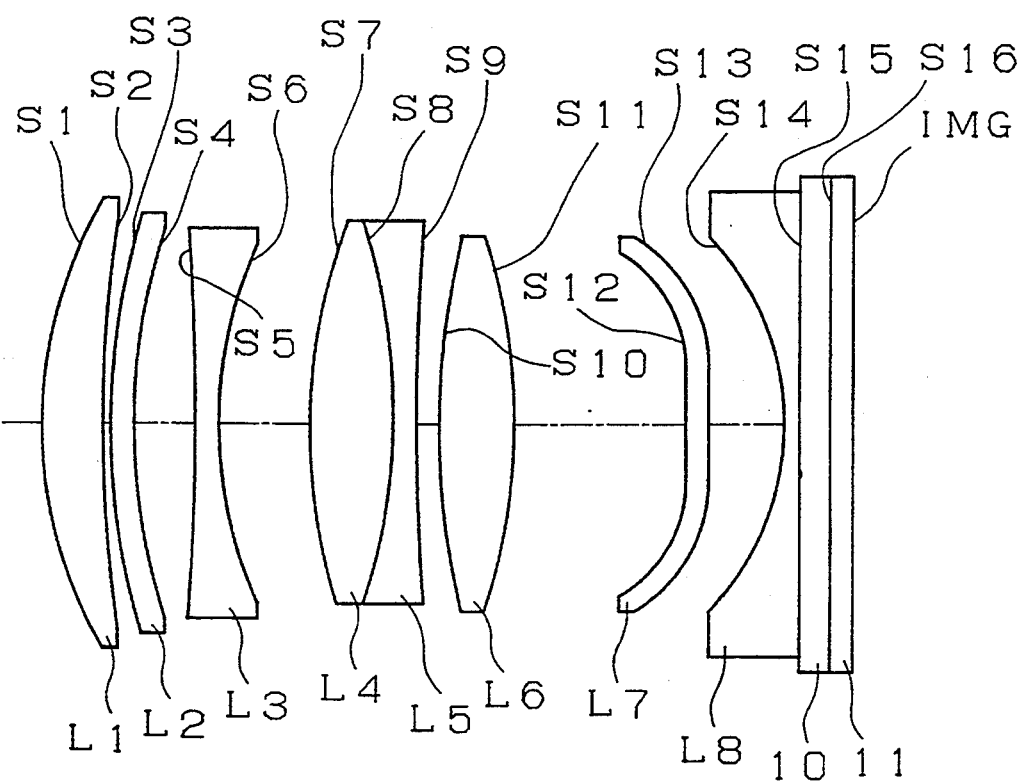
FIG. 17 is a construction diagram of a projection lens system according to a first example of a fourth embodiment.
Figure 19:
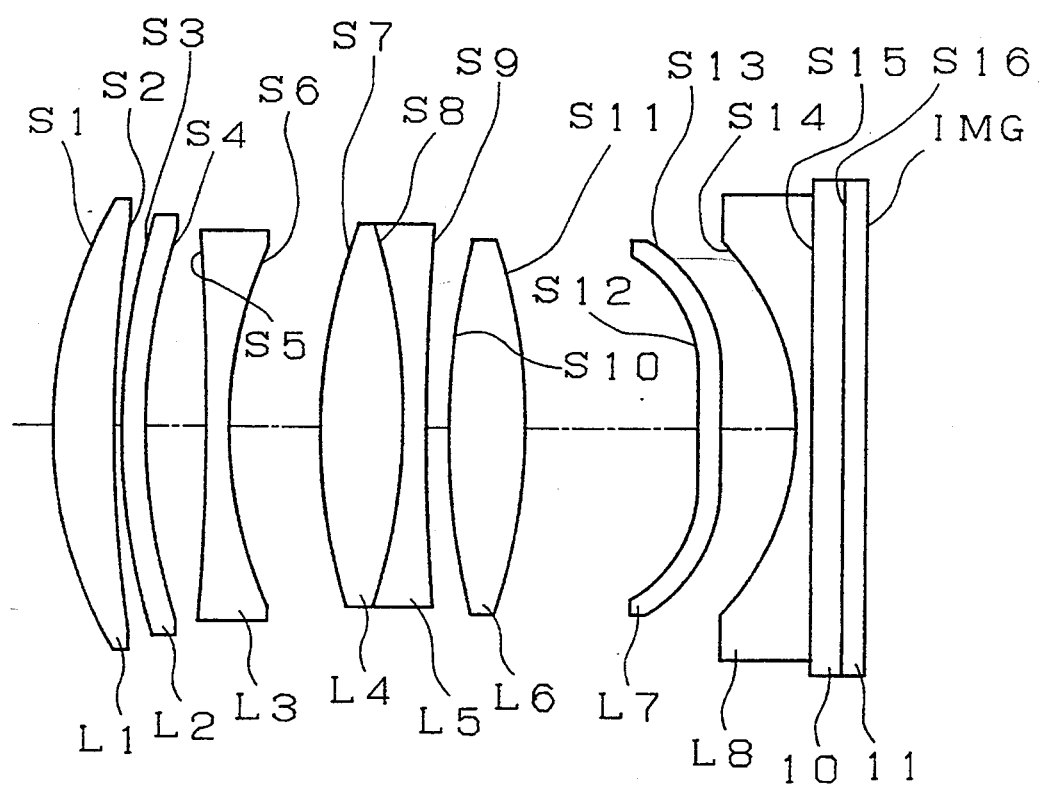
FIG. 19 is a construction diagram of a projection lens system according to a second example of the fourth embodiment.

A projection lens system according to the fourth embodiment of the present invention (the fourth invention) will be described in the following. As shown in FIGS. 17 and 19, for example, the projection lens system according to the fourth embodiment has a first lens L1 to an eighth lens L8 which are serially arranged in this order from the screen side not shown. The first lens L1 has a positive meniscus configuration in which a convex surface is directed toward The screen side. The second lens L2 has a positive meniscus configuration in which a convex surface is directed toward the screen side and has two aspherical surfaces. The third lens L3 is a negative lens. The fourth lens L4 has a positive refractive power and the two surfaces of the fourth lens L4 are convex surfaces. The fifth lens L5 is a negative lens and joined to the fourth lens L4. The sixth lens L6 is a positive lens. The seventh lens L7 has a meniscus configuration in which a concave surface is directed toward the screen side and has two aspherical surfaces. The eighth lens L8 is a negative lens. The projection lens system according to the fourth embodiment satisfies the respective conditions (17) to (20) described earlier.

(First Example)

Figure 18:
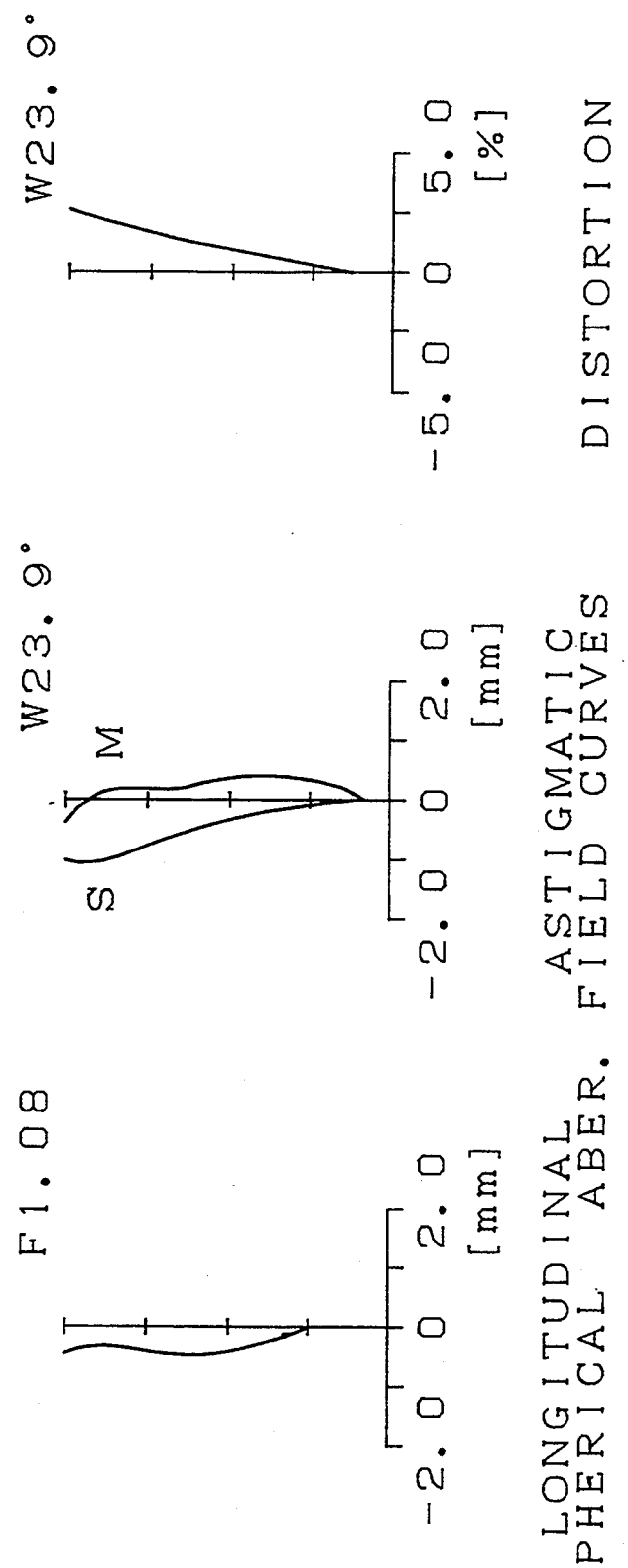
FIG. 18 is a diagram showing aberrations of the projection lens system according to the first example of the fourth embodiment.

TABLE-9 shows the construction of a projection lens system according to a first example of the fourth embodiment. FIGS. 17 and 18 are a construction diagram and a view showing aberrations, respectively, of the projection lens system according to the first example of the fourth embodiment.

TABLE 9

| fno. = 1.08 W = 23.9° |
|---|
| f = 225.36  f1 = 337.42  f3 = −217.34 |
| d4 = 24.895314  d6 = 31.625080 |

|  | R | d | N | ν |
|---|---|---|---|---|
| OBJ: | INFINITY | 2754.098429 | | |
| S1: | 165.90640 | 39.700202 | 1.591493 | 61.3 |
| S2: | 895.79799 | 2.205591 | 1 | |
| S3: | 298.50530 | 12.000000 | 1.494135 | 55.4 |
| S4: | 447.97399 | 24.895314 | 1 | |
| S5: | −2199.11714 | 7.365880 | 1.624206 | 36.3 |
| S6: | 144.77114 | 31.625080 | 1 | |
| S7: | 188.38406 | 42.021223 | 1.591493 | 61.3 |
| S8: | −279.03809 | 7.365880 | 1.624206 | 36.3 |
| S9: | 1266.99646 | 10.580608 | 1 | |
| S10: | 278.07027 | 40.000000 | 1.591493 | 61.3 |
| S11: | −339.43167 | 86.683878 | 1 | |
| S12: | −2258.51050 | 14.460738 | 1.494135 | 55.4 |
| S13: | −929.30464 | 35.568280 | 1 | |
| S14: | −120.00910 | 6.388897 | 1.624206 | 36.3 |
| S15: | INFINITY | 15.000000 | 1.401856 | |
| S16: | INFINITY | 11.000000 | 1.539678 | |
| IMG: | INFINITY | | | |

|  | cc | A4 | A6 | A8 | A10 |
|---|---|---|---|---|---|
| S3: | −1.736694 | −0.791112E-08 | 0.287087E-11 | 0.496284E-15 | −0.391706E-19 |
| S4: | 5.000000 | 0.283023E-07 | 0.330232E-11 | 0.743532E-15 | −0.532813E-19 |
| S12: | −5.000000 | −0.290845E-06 | −0.216409E-10 | 0.112558E-15 | −0.283383E-18 |
| S13: | −5.000000 | −0.246459E-06 | −0.237884E-10 | 0.472641E-15 | −0.117214E-18 |

(Second Example)

Figure 20:
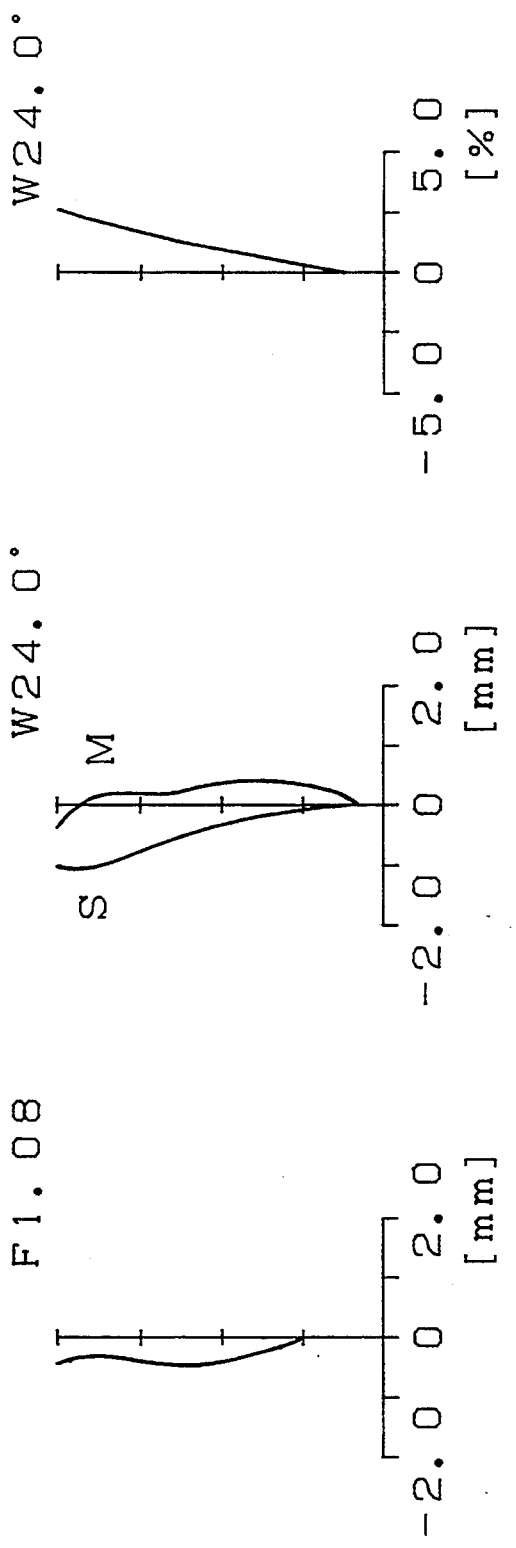
FIG. 20 is a diagram showing aberrations of the projection lens system according to the second example of the fourth embodiment.

TABLE-10 shows the construction of a projection lens system according to a second example of the fourth embodiment. FIGS. 19 and 20 are a construction diagram and a view showing aberrations, respectively, of the projection lens system according to the second example of the fourth embodiment.

cording to the fifth embodiment has a first lens L1 to an eighth lens L8 which are serially arranged in this order from the screen side not shown. The first lens L1 has a positive meniscus configuration in which a convex surface is directed toward the screen side. The second lens L2 has a positive meniscus configuration in which a

TABLE 10 fno. = 1.08  W = 24.0°
f = 224.91  f1 = 368.92  f3 = −231.10
d4 = 24.169502  d6 = 31.930280

|      | R           | d           | N        | ν    |
|------|-------------|-------------|----------|------|
| OBJ: | INFINITY    | 2750.758409 |          |      |
| S1:  | 173.14426   | 35.000000   | 1.591493 | 61.3 |
| S2:  | 775.36441   | 2.205591    | 1        |      |
| S3:  | 285.46023   | 12.000000   | 1.494135 | 55.4 |
| S4:  | 458.48797   | 24.169502   | 1        |      |
| S5:  | −4040.52850 | 7.365880    | 1.624206 | 36.3 |
| S6:  | 149.69856   | 31.930280   | 1        |      |
| S7:  | 197.73486   | 43.502258   | 1.591493 | 61.3 |
| S8:  | −269.39004  | 7.365880    | 1.624206 | 36.3 |
| S9:  | 1401.66566  | 9.827972    | 1        |      |
| S10: | 291.82820   | 45.000000   | 1.591493 | 61.3 |
| S11: | −314.55410  | 90.922822   | 1        |      |
| S12: | −1368.75226 | 12.954230   | 1.494135 | 55.4 |
| S13: | −875.33705  | 35.568280   | 1        |      |
| S14: | −120.22030  | 6.388897    | 1.624206 | 36.3 |
| S15: | INFINITY    | 15.000000   | 1.401856 |      |
| S16: | INFINITY    | 11.000000   | 1.539678 |      |
| IMG: | INFINITY    |             |          |      |

|      | cc        | A4            | A6            | A8           | A10           |
|------|-----------|---------------|---------------|--------------|---------------|
| S3:  | −1.501775 | −0.720318E-08 | 0.255887E-11  | 0.493617E-15 | −0.401591E-19 |
| S4:  | −3.694813 | 0.256139E-07  | 0.299889E-11  | 0.698495E-15 | −0.526378E-19 |
| S12: | 5.000000  | −0.301290E-06 | −0.217093E-10 | 0.507382E-15 | −0.232243E-18 |
| S13: | −0.906433 | −0.249412E-06 | −0.256663E-10 | 0.850366E-15 | −0.129793E-18 |

In each one of the projection lens systems according to the fourth embodiment (the fourth invention), since aspherical plastic lenses are employed, the relative aperture and the total field angle are advantageously large 1.08 and 47.8 degrees, respectively, and the image formation performance is excellent despite a decreased number of lenses used in the lens system, thereby opening the way to reduction in the manufacturing cost and the weight of the lens system. In addition, since the aspherical plastic lenses are finished in such a configuration which does not have a light converging function, defocusing of an image due to a temperature change is suppressed as much as possible.

Fifth Embodiment

Figure 21:
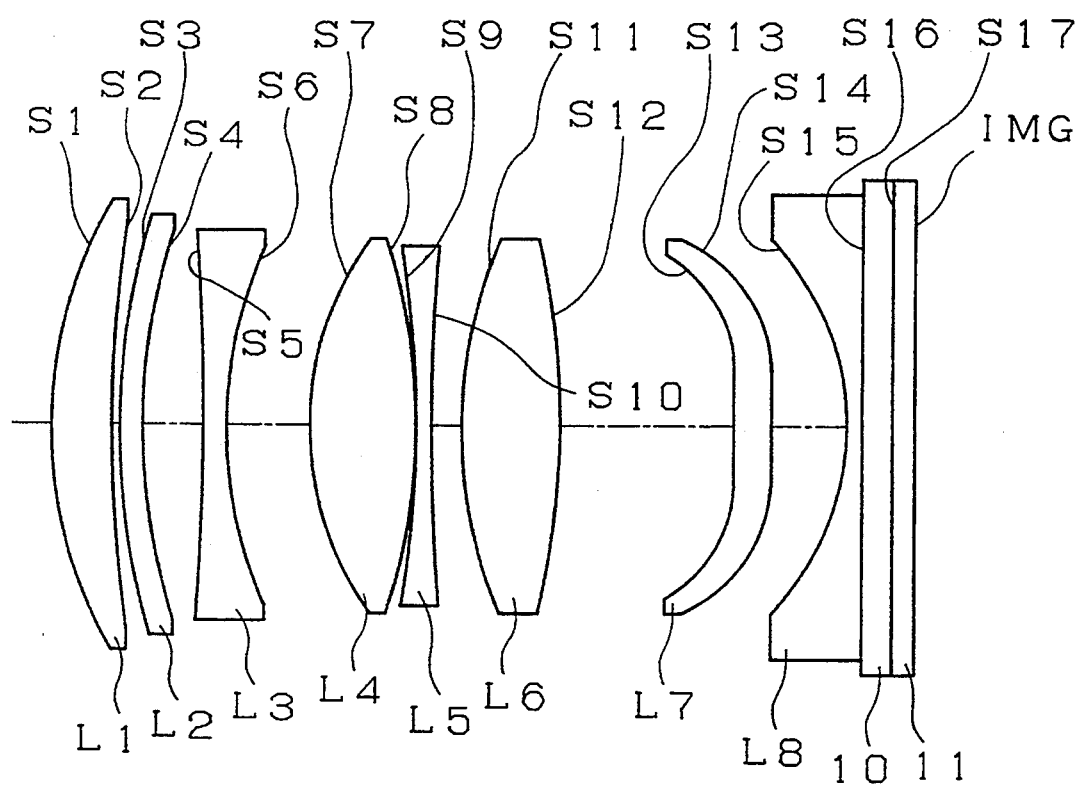
FIG. 21 is a construction diagram of a projection lens system according to a first example of a fifth embodiment.
Figure 23:
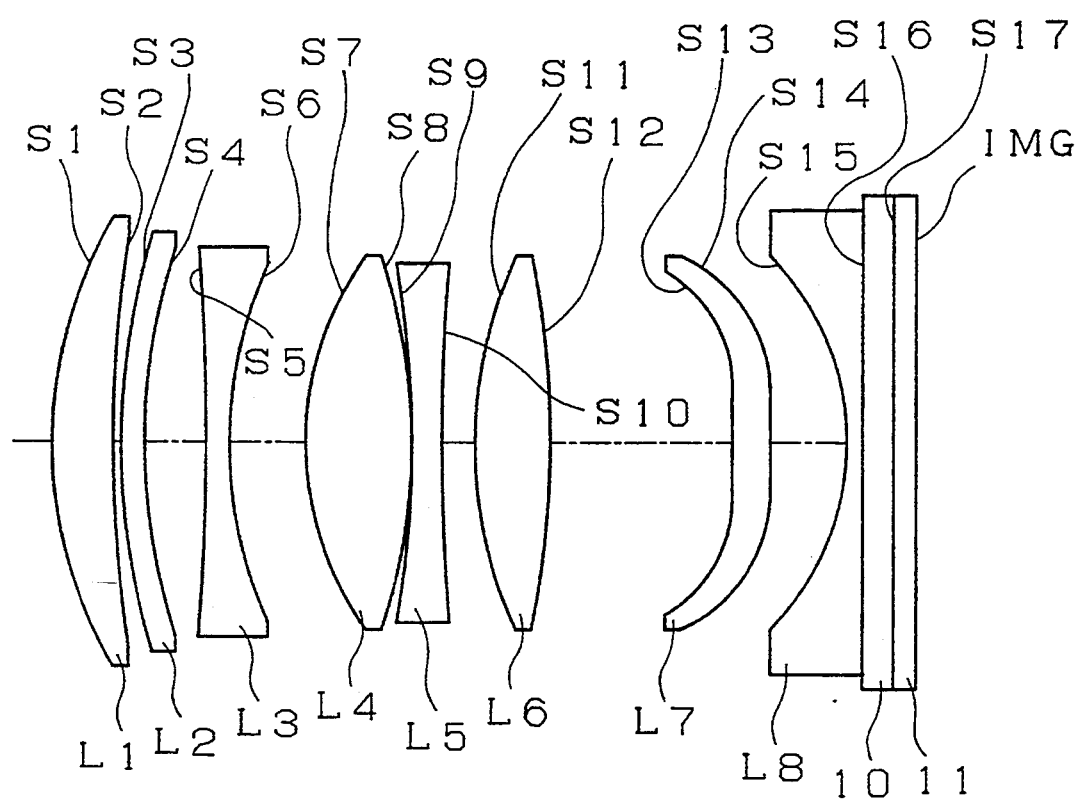
FIG. 23 is a construction diagram of a projection lens system according to a second example of the fifth embodiment.

A projection lens system according to the fifth embodiment of the present invention (the fifth invention) will be described in the following. As shown in FIGS. 21 and 23, for example, the projection lens system acconvex surface is directed toward the screen side and has two aspherical surfaces. The third lens L3 is a negative lens. The fourth lens L4 has a positive refractive power and has two convex surfaces. The fifth lens L5 is a negative lens. The sixth lens L6 is a positive lens. The seventh lens L7 has a meniscus configuration in which a concave surface is directed toward the screen side and has two aspherical surfaces. The eighth lens L8 is a negative lens. The projection lens system according to the fifth embodiment satisfies the respective conditions (21) to (24) described earlier.

(First Example)

Figure 22:
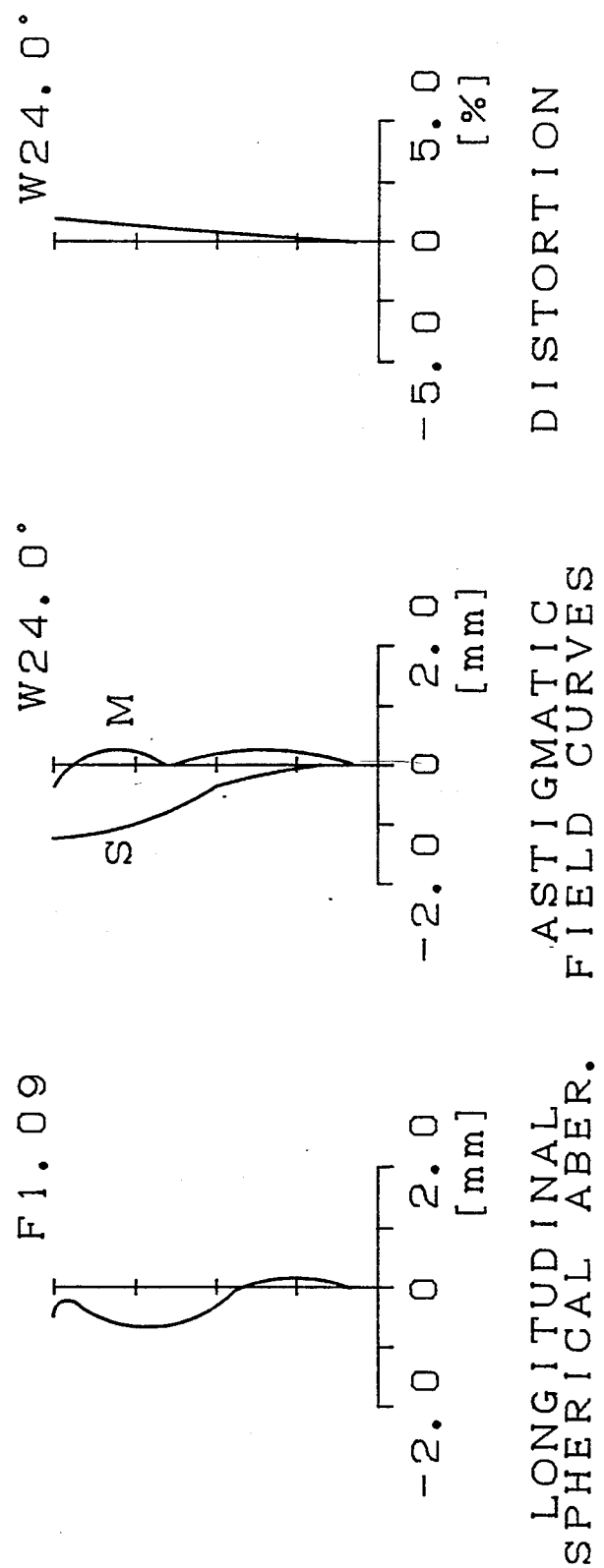
FIG. 22 is a diagram showing aberrations of the projection lens system according to the first example of the fifth embodiment.

TABLE-11 shows the construction of a projection lens system according to a first example of the fifth embodiment. FIGS. 21 and 22 are a construction diagram and a view showing aberrations, respectively, of the projection lens system according to the first example of the fifth embodiment.

TABLE 11 fno. = 1.09  W = 24.0°
f = 225.26  f1 = 378.19  f3 = −209.87
d4 = 25.597503  d6 = 32.048865

|      | R           | d           | N        | ν    |
|------|-------------|-------------|----------|------|
| OBJ: | INFINITY    | 2750.201635 |          | -    |
| S1:  | 167.65468   | 31.605226   | 1.591493 | 61.3 |
| S2:  | 622.32370   | 2.205591    | 1        |      |
| S3:  | 268.86298   | 12.000000   | 1.494135 | 55.4 |
| S4:  | 483.70865   | 25.597503   | 1        |      |
| S5:  | −1266.27954 | 7.365880    | 1.624206 | 36.3 |
| S6:  | 146.44555   | 32.048865   | 1        |      |
| S7:  | 189.32267   | 45.000000   | 1.591493 | 61.3 |
| S8:  | −293.96496  | 1.185383    | 1        |      |
| S9:  | −385.27437  | 4.000000    | 1.624206 | 36.3 |
| S10: | 1172.48926  | 16.134492   | 1        |      |
| S11: | 234.53532   | 45.000000   | 1.591493 | 61.3 |
| S12: | −540.27013  | 82.658249   | 1        |      |
| S13: | −586.84532  | 18.000000   | 1.494135 | 55.4 |

TABLE 11-continued

|  | R | d | N | ν |
|---|---|---|---|---|
| S14: | −466.06970 | 35.568280 | 1 | |
| S15: | −121.36842 | 6.388897 | 1.624206 | 36.3 |
| S16: | INFINITY | 15.000000 | 1.401856 | |
| S17: | INFINITY | 11.000000 | 1.539678 | |
| IMG: | INFINITY | | | |

|  | cc | A4 | A6 | A8 | A10 |
|---|---|---|---|---|---|
| S3: | −1.687365 | −0.912506E-08 | 0.203544E-11 | 0.428183E-15 | −0.363830E-19 |
| S4: | −5.000000 | 0.152974E-07 | 0.208860E-11 | 0.565702E-15 | −0.466508E-19 |
| S13: | 5.000000 | −0.314076E-06 | −0.197298E-10 | −0.262972E-15 | −0.169916E-18 |
| S14: | 5.000000 | −0.256971E-06 | −0.263674E-10 | 0.167385E-14 | −0.139420E-18 |

(Second Example)

TABLE-12 shows the construction of a projection lens system according to a second example of the fifth embodiment. FIGS. 23 and 24 are a construction diagram and a view showing aberrations, respectively, of the projection lens system according to the second example of the fifth embodiment.

TABLE 12 fno. = 1.09   W = 23.9°
f = 225.67   f1 = 367.07   f3 = 205.97
d4 = 26.465512   d6 = 30.333051

|  | R | d | N | ν |
|---|---|---|---|---|
| OBJ: | INFINITY | 2753.738935 | | |
| S1: | 166.53318 | 33.479124 | 1.591493 | 61.3 |
| S2: | 621.34001 | 2.205591 | 1 | |
| S3: | 261.78431 | 12.000000 | 1.494135 | 55.4 |
| S4: | 442.31488 | 26.465512 | 1 | |
| S5: | −1271.63055 | 7.365880 | 1.624206 | 36.3 |
| S6: | 143.34489 | 30.333051 | 1 | |
| S7: | 183.16823 | 42.371869 | 1.591493 | 61.3 |
| S8: | −275.45000 | 2.000000 | 1 | |
| S9: | −314.26954 | 7.836025 | 1.624206 | 36.3 |
| S10: | 1467.57927 | 18.968688 | 1 | |
| S11: | 233.93887 | 35.000000 | 1.591493 | 61.3 |
| S12: | −510.40333 | 82.658249 | 1 | |
| S13: | −789.45702 | 16.782514 | 1.494135 | 55.4 |
| S14: | −589.10686 | 37.758580 | 1 | |
| S15: | −122.51211 | 5.995982 | 1.624206 | 36.3 |
| S16: | INFINITY | 15.000000 | 1.401856 | |
| S17: | INFINITY | 11.000000 | 1.539678 | |
| MG: | INFINITY | | | |

|  | cc | A4 | A6 | A8 | A10 |
|---|---|---|---|---|---|
| S3: | −1.618292 | −0.886120E-08 | 0.194908E-11 | 0.431622E-15 | −0.362118E-19 |
| S4: | −5.000000 | 0.155594E-07 | 0.219929E-11 | 0.557392E-15 | −0.462466E-19 |
| S13: | 21.895216 | −0.329963E-06 | −0.200164E-10 | −0.254988E-15 | −0.166853E-18 |
| S14: | 10.703152 | −0.271944E-06 | −0.266678E-10 | 0.168475E-14 | −0.138472E-18 |

In each one of the projection lens systems according to the fifth embodiment (the fifth invention), since aspherical plastic lenses are employed, the relative aperture and the total field angle are advantageously large 1.09 and 47.8 degrees, respectively, and the image formation performance is excellent despite a decreased number of lenses used in the lens system, thereby opening the way to reduction in the manufacturing cost and the weight of the lens system. In addition, since the aspherical plastic lenses are finished in such a configuration which does not have a light converging function, defocusing of an image due to a temperature change is suppressed as much as possible.

As this invention may be embodied in several forms without departing from the spirit of the essential characteristics thereof, the present embodiment is therefore illustrative and not restrictive, since the scope of the invention is defined by the appended claims rather than by the description preceding them. Thus, all changes that fall within the metes and bounds of the claims, or equivalence of such metes and bounds thereof are therefore, intended to be embraced by the claims.

What is claimed is:

1. A projection lens system comprising from a screen side: a first lens of a meniscus configuration, the first lens having a convex surface directed toward the screen side, the power of the first lens being positive near the optical axis and changing to negative at a distance from the optical axis toward a peripheral portion of the lens, the first lens having two aspherical surfaces;

a second lens of a positive power meniscus configuration, the second lens having a convex surface directed toward the screen side and having two aspherical surfaces;

a third lens of a positive power meniscus configuration, the third lens having a convex surface directed toward the screen side;

a fourth lens disposed close to the third lens and having two convex surfaces;

a fifth lens of a positive power meniscus configuration, the fifth lens having a concave surface directed toward the screen side and having two aspherical surfaces; and a sixth lens having a concave surface with a large curvature directed toward the screen side, a surface of the sixth lens on the screen side including an aspherical surface.

2. A projection lens system according to claim 1, wherein the following conditions are satisfied:

$$0.0 \geq f/f12 \geq 0.2,$$

$$0.9 \geq D8/f \geq 1.0, \text{ and}$$

$$0.2 < f4/f3 < 0.8$$

wherein
- f is the focal length of the total lens system;
- f12 is the composite focal length of the first lens and the second lens;
- D8 is a distance from an apex on an image side surface of the fourth lens to an image plane;
- f3 is the focal length of the third lens; and
- f4 is the focal length of the fourth lens;

3. A projection lens system according to claim 1, wherein the following condition is satisfied:

$$n1 \leq n2 \leq n5 \leq n6$$

wherein,
- n1 is the refractive index of the first lens;
- n2 is the refractive index of the second lens;
- n5 is the refractive index of the fifth lens; and
- n6 is the refractive index of the sixth lens.

4. A projection lens system comprising, from a screen side:
- a first lens of a positive power meniscus configuration, the first lens having a convex surface directed toward the screen side;
- a second lens of a positive power meniscus configuration, the second lens having a convex surface directed toward the screen side and having two aspherical surfaces;
- a negative third lens;
- a positive fourth lens;
- a positive fifth lens;
- a negative sixth lens;
- a positive seventh lens;
- an eighth lens of a meniscus configuration, the eighth lens having a concave surface directed toward the screen side and having two aspherical surfaces; and
- a negative ninth lens, wherein the following conditions are satisfied, $$-2.0 < f6/f45 < 1.7, \text{ and}$$

$$1.7 < f7/f45 < 1.9$$

wherein,
- f45 is the composite focal length of the fourth lens and the fifth lens,
- f6 is the focal length of the sixth lens, and
- f7 is the focal length of the seventh lens.

5. A projection lens system according to claim 4, wherein the following conditions are satisfied:

$$t1 < 7000/D1,$$

$$t7 < 7000/D7,$$

$$t9 < 7000/D9, \text{ and}$$

$$t13 < 7000/D13,$$

wherein,
- t1 is the thickness of the first lens taken at the center of the first lens,
- t7 is the thickness of the fourth lens taken at the center of the fourth lens,
- t9 is the thickness of the fifth lens taken at the center of the fifth lens,
- t13 is the thickness of the seventh lens taken at the center of the seventh lens,
- D1 is the diameter of the first lens,
- D7 is the diameter of the fourth lens,
- D9 is the diameter of the fifth lens, and
- D13 is the diameter of the seventh lens.

6. A projection lens system comprising, from a screen side:
- a first lens of a positive power meniscus configuration, the first lens having a convex surface directed toward the screen side;
- a second lens of a positive power meniscus configuration, the second lens having a convex surface directed toward the screen side and having two aspherical surfaces;
- a negative third lens;
- a positive fourth lens;
- a negative fifth lens;
- a positive sixth lens;
- a positive seventh lens;
- an eighth lens of a meniscus configuration, the eighth lens having a concave surface directed toward the screen side and having two aspherical surfaces; and
- a negative ninth lens, wherein the following conditions are satisfied, $$-2.1 < f5/f4 < -1.4,$$

and $$0.7 < f67/f4 < 0.9,$$

wherein,
- f4 is the focal length of the fourth lens,
- f5 is the focal length of the fifth lens, and
- f67 is the composite focal length of the sixth lens and the seventh lens.

7. A projection lens system according to claim 6, wherein the following conditions are satisfied:

$$t1 < 7000/D1,$$

$$t7 < 7000/D7,$$

$$t11 < 7000/D11, \text{ and}$$

$$t13 < 7000/D13,$$

wherein,
- t1 is the thickness of the first lens taken at the center of the first lens,
- t7 is the thickness of the fourth lens taken at the center of the fourth lens,
- t11 is the thickness of the sixth lens taken at the center of the sixth lens,
- t13 is the thickness of the seventh lens taken at the center of the seventh lens,
- D1 is the diameter of the first lens,
- D7 is the diameter of the fourth lens,
- D11 is the diameter of the sixth lens, and
- D13 is the diameter of the seventh lens.

8. A projection lens system comprising, from a screen side:

a first lens of a positive power meniscus configuration, the first lens having a convex surface directed toward the screen side;

a second lens of a positive power meniscus configuration, the second lens having a convex surface directed toward the screen side and having two aspherical surfaces;

a negative third lens;

a fourth lens having two convex surfaces and having a positive refractive power;

a negative fifth lens joined to the fourth lens;

a positive sixth lens;

a seventh lens of meniscus configuration, the seventh lens having a concave surface directed toward the screen side and having two aspherical surfaces; and a negative eighth lens, wherein the following conditions are satisfied, $$0.6 < f/f1 < 0.7,$$

$$-1.1 < f/f3 < -0.9,$$

$$0.1 < t4/f < 0.2, \text{ and}$$

$$1.2 < t6/t4 < 1.4,$$

wherein,
f is the focal length of the total lens system,
f1 is the focal length of the first lens,
f3 is the focal length of the third lens,
t4 is an interval between an optical axis of the second lens and an optical axis of the third lens, and
t6 is an interval between an optical axis of the third lens and an optical axis of the fourth lens.

9. A projection lens system comprising from a screen side:

a first lens of a positive power meniscus configuration, the first lens having a convex surface directed toward the screen side;

a second lens of a positive power meniscus configuration, the second lens having a convex surface directed toward the screen side and having two aspherical surfaces;

a negative third lens;

a fourth lens having two convex surfaces and having a positive refractive power;

a negative fifth lens disposed close to the fourth lens;

a positive sixth lens;

a seventh lens of meniscus configuration, the seventh lens having a concave surface directed toward the screen side and having two aspherical surfaces; and a negative eighth lens, wherein the following conditions are satisfied, $$0.5 < f/f1 < 0.7,$$

$$-1.1 < f/f3 < -1.0,$$

$$0.1 < t4/f < 0.2, \text{ and}$$

$$1.1 < t6/t4 < 1.3,$$

wherein,
f is the focal length of the total lens system,
f1 is the focal length of the first lens,
f3 is the focal length of the third lens,
t4 is an interval between an optical axis of the second lens and an optical axis of the third lens,
t6 is an interval between an optical axis of the third lens and an optical axis of the fourth lens.

* * * * *